(12) United States Patent
Lynaugh et al.

(10) Patent No.: US 12,557,203 B2
(45) Date of Patent: Feb. 17, 2026

(54) METHODS FOR OPERATING A PLASMA TORCH

(71) Applicant: The ESAB Group Inc., Florence, SC (US)

(72) Inventors: Ryan T. Lynaugh, Cornish, NH (US); Geoffrey Putnam, Charlestown, NH (US); Christopher Vincent Braudis, Sr., Canaan, NH (US)

(73) Assignee: THE ESAB GROUP INC., North Bethesda, MD (US)

( * ) Notice: Subject to any disclaimer, the term of this patent is extended or adjusted under 35 U.S.C. 154(b) by 698 days.

(21) Appl. No.: 16/731,455

(22) Filed: Dec. 31, 2019

(65) Prior Publication Data
US 2021/0204387 A1    Jul. 1, 2021

(51) Int. Cl.
*H05H 1/34*    (2006.01)
*B23K 10/00*    (2006.01)

(52) U.S. Cl.
CPC ........... *H05H 1/3405* (2013.01); *B23K 10/00* (2013.01)

(58) Field of Classification Search
CPC .... H05H 1/3405; H05H 1/3494; B23K 10/00; B23K 10/006
See application file for complete search history.

(56) References Cited

U.S. PATENT DOCUMENTS

| | | | |
|---|---|---|---|
| 4,861,962 A | 8/1989 | Sanders et al. | |
| 5,120,930 A | 6/1992 | Sanders et al. | |
| 5,132,512 A | 7/1992 | Sanders et al. | |
| 5,294,773 A | 3/1994 | Lambert | |
| 5,396,043 A | 3/1995 | Couch, Jr. et al. | |
| 5,614,110 A | 3/1997 | Shintani et al. | |

(Continued)

FOREIGN PATENT DOCUMENTS

| | | |
|---|---|---|
| CN | 101175596 A | 5/2008 |
| CN | 207840380 U | 9/2018 |

(Continued)

OTHER PUBLICATIONS

Notification of Transmittal of International Search Report and Written Opinion including International Search Report and Written Opinion for International Application No. PCT/US2020/065045 dated Mar. 24, 2021, 17 pages.

(Continued)

*Primary Examiner* — Jimmy Chou
*Assistant Examiner* — Thao Uyen Tran-Le
(74) *Attorney, Agent, or Firm* — Edell, Shapiro & Finnan, LLC

(57) ABSTRACT

A method for piercing and cutting a workpiece includes delivering a plasma gas at a first pressure through a process gas flow channel of a plasma torch while ionizing the plasma gas to produce a plasma arc that extends between an electrode of the torch and the workpiece. While the plasma gas is delivered at the first pressure, performing a piercing operation by producing a pierce hole in the workpiece using the plasma arc. Subsequent to the piercing operation, performing a cutting operation by delivering through the process gas flow channel the plasma gas at a second pressure lower than the first pressure and with the forming a cut in the workpiece that originates at and extends away from a boundary of the pierce hole.

15 Claims, 17 Drawing Sheets

(56) References Cited

U.S. PATENT DOCUMENTS

| | | | |
|---|---|---|---|
| 5,653,895 A | 8/1997 | Shintani | |
| 5,717,187 A * | 2/1998 | Rogozinski | B05B 15/18 |
| | | | 219/121.54 |
| 5,747,767 A | 5/1998 | Severance et al. | |
| 6,069,339 A | 5/2000 | McGrath et al. | |
| 6,093,905 A | 7/2000 | Hardwick et al. | |
| 6,163,009 A * | 12/2000 | Hardwick | H05H 1/26 |
| | | | 219/121.57 |
| 6,207,923 B1 | 3/2001 | Lindsay | |
| 6,244,927 B1 * | 6/2001 | Zeng | B23K 7/10 |
| | | | 451/99 |
| 6,326,583 B1 | 12/2001 | Hardwick et al. | |
| 6,914,209 B2 | 7/2005 | Yamaguchi et al. | |
| 6,914,211 B2 | 7/2005 | Brasseur et al. | |
| 7,015,412 B1 | 3/2006 | Uttrachi | |
| 7,019,248 B1 | 3/2006 | Uttrachi | |
| 7,137,544 B2 | 11/2006 | Caddell, Jr. et al. | |
| 7,326,874 B2 | 2/2008 | Brasseur et al. | |
| 7,605,340 B2 | 10/2009 | Duan | |
| 7,737,383 B2 | 6/2010 | Hussary et al. | |
| 7,829,816 B2 | 11/2010 | Duan et al. | |
| 7,935,909 B2 | 5/2011 | Hussary et al. | |
| 8,168,916 B2 | 5/2012 | Hussary et al. | |
| 8,212,173 B2 | 7/2012 | Liebold et al. | |
| 8,258,421 B2 | 9/2012 | Halvorsen et al. | |
| 8,319,142 B2 | 11/2012 | Hussary et al. | |
| 8,338,739 B2 | 12/2012 | Lindsay et al. | |
| 8,354,608 B2 | 1/2013 | Dave et al. | |
| 8,354,609 B2 | 1/2013 | Lindsay et al. | |
| 8,354,610 B2 | 1/2013 | Lindsay et al. | |
| 8,389,887 B2 | 3/2013 | Liebold et al. | |
| 8,395,074 B2 | 3/2013 | Winn et al. | |
| 8,395,077 B2 | 3/2013 | Duan et al. | |
| 8,436,270 B2 | 5/2013 | Lindsay et al. | |
| 8,450,637 B2 | 5/2013 | Luce et al. | |
| 8,513,565 B2 | 8/2013 | Duan | |
| 8,541,711 B2 | 9/2013 | Lindsay et al. | |
| 8,653,417 B2 * | 2/2014 | Peters | B23K 9/0671 |
| | | | 219/130.21 |
| 8,674,256 B2 | 3/2014 | Hussary et al. | |
| D702,272 S | 4/2014 | Furujo et al. | |
| 8,710,395 B2 | 4/2014 | Lindsay et al. | |
| 8,710,396 B2 | 4/2014 | Salsich et al. | |
| 8,981,252 B2 | 3/2015 | Liebold et al. | |
| 9,210,787 B2 | 12/2015 | Hussary et al. | |
| 9,457,419 B2 | 10/2016 | Namburu | |
| 9,572,242 B2 | 2/2017 | Namburu | |
| 9,609,734 B2 | 3/2017 | Stone | |
| 9,686,848 B2 | 6/2017 | Namburu | |
| 9,789,561 B2 | 10/2017 | Liebold et al. | |
| 9,883,575 B2 | 1/2018 | Namburu | |
| 9,931,708 B2 | 4/2018 | Salsich et al. | |
| 10,137,522 B2 | 11/2018 | Winn | |
| 10,279,417 B2 | 5/2019 | Jogdand et al. | |
| 10,322,466 B2 | 6/2019 | Namburu et al. | |
| 10,328,516 B2 | 6/2019 | Salsich et al. | |
| 10,335,887 B2 | 7/2019 | Hodges et al. | |
| 10,589,372 B2 | 3/2020 | Kerecelidze | |
| 10,722,971 B2 * | 7/2020 | Mitra | H05H 1/36 |
| 2002/0166848 A1 * | 11/2002 | Furujo | B23K 26/1438 |
| | | | 219/121.72 |
| 2004/0112875 A1 * | 6/2004 | Yamaguchi | B23K 10/00 |
| | | | 219/121.44 |
| 2005/0035093 A1 * | 2/2005 | Yamaguchi | B23K 10/006 |
| | | | 219/121.54 |
| 2005/0045600 A1 * | 3/2005 | Tatham | H05H 1/34 |
| | | | 219/121.51 |
| 2005/0077271 A1 * | 4/2005 | Delzenne | B23K 10/006 |
| | | | 219/121.44 |
| 2006/0163216 A1 * | 7/2006 | Brandt | H05H 1/34 |
| | | | 219/121.39 |
| 2006/0163220 A1 | 7/2006 | Brandt et al. | |
| 2007/0158321 A1 | 7/2007 | Caddell, Jr. et al. | |
| 2007/0181540 A1 * | 8/2007 | Lindsay | H05H 1/341 |
| | | | 219/121.5 |
| 2008/0006614 A1 | 1/2008 | Brandt et al. | |
| 2008/0210670 A1 | 9/2008 | Brandt et al. | |
| 2008/0217305 A1 * | 9/2008 | Sanders | H05H 1/28 |
| | | | 219/121.52 |
| 2009/0057276 A1 * | 3/2009 | Hussary | H05H 1/34 |
| | | | 137/7 |
| 2012/0145680 A1 * | 6/2012 | Warren, Jr. | H05H 1/34 |
| | | | 219/121.44 |
| 2012/0261392 A1 * | 10/2012 | Barnett | H05H 1/3405 |
| | | | 219/121.59 |
| 2013/0112660 A1 | 5/2013 | Enyedy et al. | |
| 2014/0110381 A1 | 4/2014 | Mather et al. | |
| 2015/0014285 A1 * | 1/2015 | Patel | H05H 1/34 |
| | | | 219/121.5 |
| 2015/0289354 A1 * | 10/2015 | Stone | H05H 1/40 |
| | | | 219/121.5 |
| 2015/0342019 A1 * | 11/2015 | Peters | B23K 10/006 |
| | | | 219/121.51 |
| 2016/0136764 A1 | 5/2016 | Enyedy et al. | |
| 2016/0193682 A1 | 7/2016 | Vogel et al. | |
| 2017/0001255 A1 * | 1/2017 | Winn | B23K 10/006 |
| 2017/0095877 A1 | 4/2017 | Ames et al. | |
| 2017/0095878 A1 * | 4/2017 | Liebold | B23K 10/006 |
| 2017/0095879 A1 * | 4/2017 | Mitra | B23K 10/00 |
| 2017/0225253 A1 * | 8/2017 | Matsuoka | B23K 9/095 |
| 2017/0295637 A1 | 10/2017 | Peters et al. | |
| 2018/0084631 A1 | 3/2018 | Peters et al. | |
| 2018/0361497 A1 | 12/2018 | Nowak | |
| 2019/0210143 A1 | 7/2019 | Jogdand et al. | |
| 2023/0247752 A1 | 8/2023 | Putnam et al. | |

FOREIGN PATENT DOCUMENTS

| | | | |
|---|---|---|---|
| EP | 1324644 A2 | 2/2003 | |
| JP | H11141822 A | 5/1999 | |
| WO | 9116166 A1 | 10/1991 | |
| WO | WO-2006126339 A1 * | 11/2006 | H05H 1/34 |
| WO | 2021138044 A1 | 7/2021 | |

OTHER PUBLICATIONS

Notification of Transmittal of International Search Report and Written Opinion including International Search Report and Written Opinion for International Application No. PCT/US2023/061273 dated May 15, 2023, 14 pages.

Examination Report No. 1 for Australian Patent Application No. 2020416708 dated Jun. 8, 2023, 4 pages.

Office Action for Canadian Patent Application No. 3,162,975 dated Aug. 9, 2023, 5 pages.

First Office Action including search report issued by CNIPA for Chinese Patent Application No. 202080091535.8 on Mar. 29, 2025 with English translation, 16 pages.

* cited by examiner

METHODS FOR OPERATING A PLASMA TORCH

TECHNICAL FIELD

The present disclosure relates to methods for operating a plasma torch during a piercing and cutting of a workpiece.

BACKGROUND

The cutting of workpieces of enhanced thicknesses typically comprises the formation of a pierce hole in the workpiece followed by a cutting of the workpiece along a designated path to produce a desired work product. A need remains in the art to provide methods of operating a plasma torch that guard against arc extinguishment during the formation of pierce holes, to provide an effective transition between piercing and cutting operations without compromising the useful life of the torch consumables and to minimize the production of scrap material.

SUMMARY

Methods for piercing and cutting a metal workpiece are disclosed.

According to one implementation a method for piercing and cutting a workpiece is provided that involves delivering a plasma gas at a first pressure through a process gas flow channel of a plasma torch while ionizing the plasma gas to produce a plasma arc that extends between the electrode and the workpiece. With the plasma gas being provided at the first pressure a piercing operation is carried out to produce a pierce hole in the workpiece that extends between opposing surfaces of the workpiece. Subsequent to the piercing operation a cutting operation is performed by delivering through the process gas flow channel of the torch the plasma gas at a second pressure lower than the first pressure. The cutting operation is initiated by forming a cut in the workpiece that originates at and extends away from a boundary of the pierce hole. According to some implementations the first pressure is 10% to 50% greater than the second pressure.

Providing the plasma gas at an elevated pressure during piercing as compared to its pressure during cutting results in an overall increase in power and the momentum of the arc. Thus, at a given current level delivered to the electrode of the plasma torch during piercing, in order for ionization of the plasma gas to occur, the voltage applied across the electrode must be increased due to the increase in arc chamber pressure. The increase in voltage results in the plasma arc operating at a higher power (P=V*I) to produce higher plasma arc enthalpy. This facilitates a more effective melting of the metal during piercing, particularly in workpieces of enhanced thicknesses (e.g. >1.0 inch). The higher pressure also increases the momentum of the plasma jet stream causing it to strike the workpiece with a greater force. This advantageously results in a greater amount of molten metal being expelled from the pierce during the formation of the pierce hole to make way for the plasma arc as the pierce depth increases. In addition, as a result of the higher striking force coupled and a strategic placement of side exit holes in the shield cap, the molten metal is dispersed over a greater area reducing the formation of large pools around the circumference of the produced pierce hole. This has the advantage of reducing lead-in lengths between the pierce hole and a location where the cut pattern of the workpiece originates for lack of having to maneuver around large pierce puddles. The reduced lead-in length reduces the cut time and also results in less scrap metal being produced during the cutting process. The risk of the torch colliding with molten and/or solidified pierce puddles is also reduced.

According to some implementations the plasma gas is delivered into the process gas flow channel at different pressures during the piercing operation. According to one implementation, during a first part of the piercing process the plasma gas is delivered at a first pressure and is thereafter delivered at a second pressure greater than the first pressure. According to some implementations the plasma gas pressure is progressively increased as the depth of the pierce increases. According to one implementation the progressive increase in plasma gas pressure occurs in a linear manner, while according to another implementation the progressive increase in plasma gas pressure occurs in an exponential manner.

According to some implementations the plasma gas is delivered into the process gas flow channel at different pressures in an alternating/pulsed manner during the piercing operation so that the momentum of the plasma jet stream is varied. According to some implementations the variation occurs at a given frequency while in other implementations the variation occurs in a non-uniform manner. According to some implementations the magnitude of the plasma pressure variations remains constant during the piercing operation, while according to other implementations the magnitude of the pressure variations change over time. According to some implementations the main cutting current delivered to the plasma torch electrode is also varied/pulsed during the piercing phase. According to one such implementation the main cutting current and plasma gas pressure are pulsed in unison so that the plasma gas pressure and main cutting current peak at essentially the same time.

According to some implementations shield gas is provided during the piercing and cutting operations for the purpose of providing a protective gas that surrounds the plasma arc and as protection for the nozzle against molten spray blow back. According to some implementations the shield gas is delivered into a shield gas flow channel of the plasma torch at a first pressure during the piercing operation and is subsequently provided at a second pressure less than the first pressure during the cutting operation.

These and other advantages and features will become evident in view of the drawings and detailed description.

DETAILED DESCRIPTION

Figure 1:
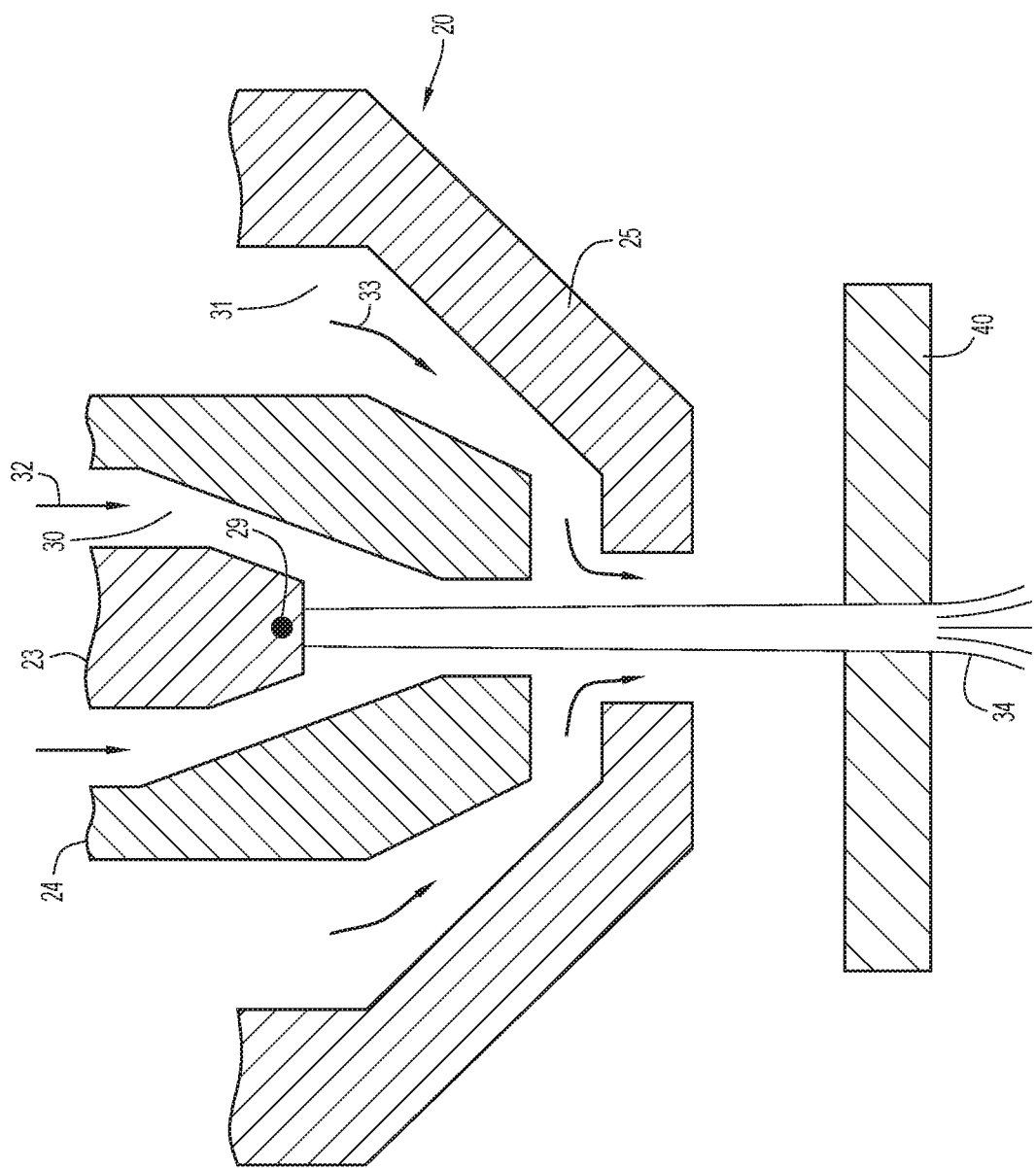
FIG. 1 is a cross-section view of an end portion of a plasma torch.

FIG. 1 is a simplified illustration of a distal end portion of a plasma torch 20 according to one implementation. FIG. 1 illustrates the plasma torch without various components or parts, such as power or gas transfer components, that are typically included in a plasma cutting torch. Instead, FIG. 1 only illustrates select components or parts that allow for a clear and concise illustration of the techniques presented herein. In the depicted implementation, the torch includes a number of consumable parts, such as, for example, an electrode 23, a nozzle 24, a shield cap 25. Located in a distal end portion of the electrode 23 is an emitter 29. The electrode 23 can be installed into the torch body and the torch nozzle 24 can be installed there over. Alternatively, the electrode 23 and nozzle 24 can be installed onto the torch body as a single component (e.g., these components may be coupled to each other to form a cartridge and installed on/in the torch body as a cartridge).

Once the electrode 23 and the nozzle 24 are installed on the torch body, the shield cap 25 is installed around an installation flange of the nozzle 24 in order to secure nozzle 24 and electrode 23 in place at (and in axial alignment with) an operating end of the torch body. Additionally or alternatively, the nozzle 24 and/or electrode 23 can be secured or affixed to the torch body in any desirable manner, such as by mating threaded sections included on the torch body with corresponding threads included on the components. For example, in some implementations, the electrode 23, nozzle 24, shield cap 25, as well as any other components (e.g., a lock ring, spacer, secondary cap, etc.) may be assembled together in a cartridge that may be selectively coupled to the torch body. For example, the various components may be coupled to a cartridge body or coupled to each other to form a cartridge.

In use, the plasma torch 20 is configured to emit a plasma arc 34 between the electrode 23 and a workpiece 40 to which a work lead associated with a power supply is attached. As shown in FIG. 1, the nozzle 24 is spaced a distance away from the electrode 23 with there being a process gas flow channel 30 disposed between them through which process gas 32 flows when the torch is operated. The shield cap 25 is also spaced a distance away from the nozzle 24 with there being a shield gas flow channel 31 disposed between them through which a shield gas 33 flows when the torch is operated.

Figure 2:
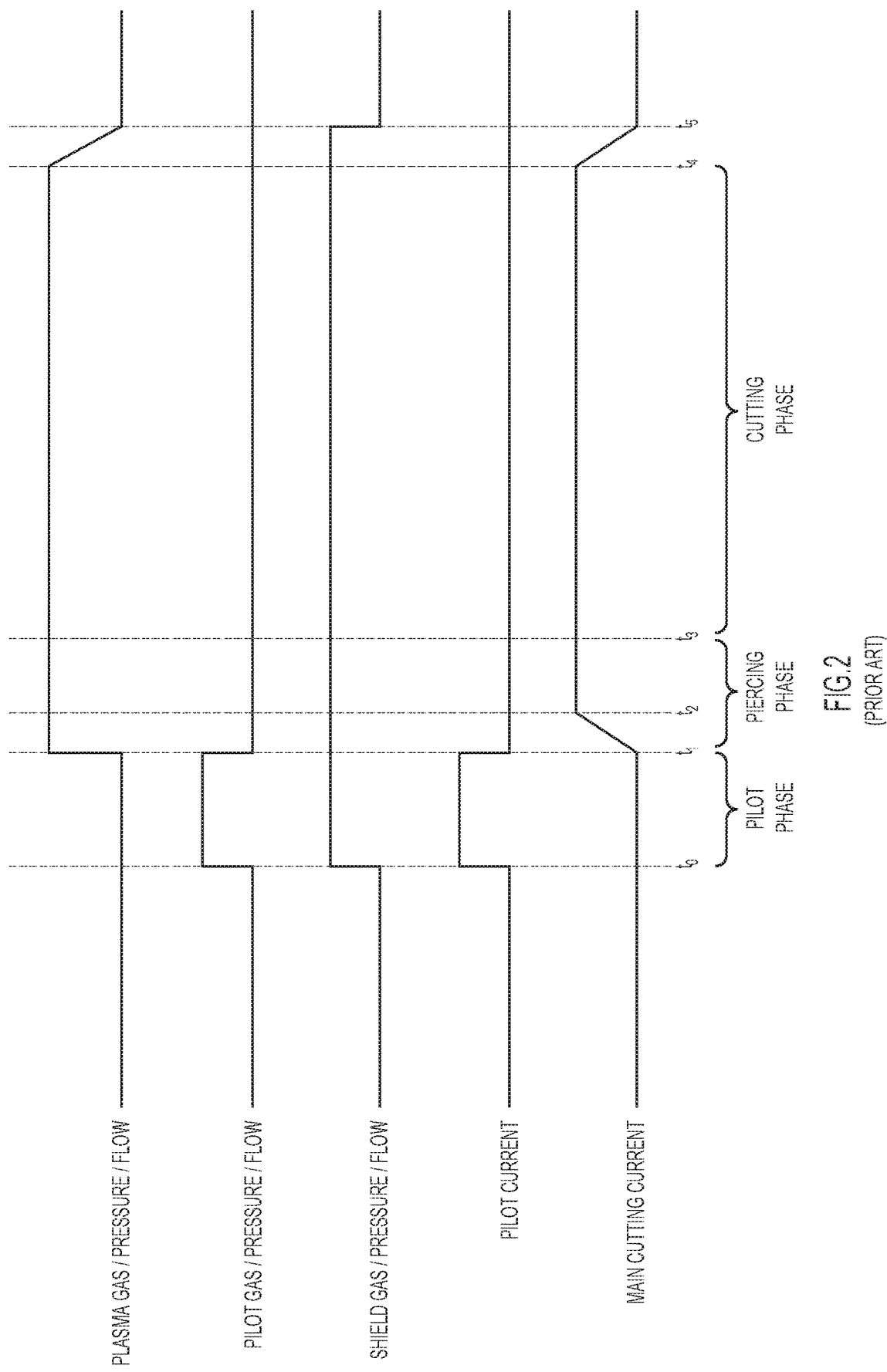
FIG. 2 is a graph showing variations in plasma torch operating parameters over time according to the present state of the art.

FIG. 2 depicts a timeline showing how pilot current $C_p$, main cutting current, pilot gas, plasma gas and shield gas are supplied to a plasma torch during a plasma torch cutting operation according to the current state of the art. During initiation at time to, a high voltage and high frequency signal is applied between the electrode 23 and the nozzle 24 to produce an arc between them that extends across the process gas flow passage through which pilot gas is supplied. As pilot gas flows through channel 30 during arc initiation it is ionized to form an electrically conductive plasma arc that is then directed out the nozzle 24 toward the electrically conductive workpiece 40 (e.g. metal workpiece). Upon the plasma arc transferring to the workpiece 40 at time $t_1$, main cutting current is thereafter supplied to the electrode 23 at full cutting current $C_f$ and an electrical circuit is established between the power source and the workpiece. At time $t_1$ plasma gas 32 is also provided through the process gas flow channel. A plasma arc 34 that closes the electrical circuit is thus established between the electrode 23 and the workpiece, the plasma arc being sufficient to cut through the workpiece by a localized melting of the material from which the workpiece is made. As shown in FIG. 2, when main cutting current is supplied to the electrode 23, pilot current to the nozzle 24 is terminated and the supply of pilot gas ceases as the supply of plasma gas is initiated. According to some implementations, the pilot gas and the plasma gas are the same. In such instances, the switching from pilot gas to plasma gas may only involve increasing the gas pressure. As further illustrated in FIG. 2, a shield gas is typically caused to flow through the shield gas flow channel 31 beginning at time to.

In the current state of the art example of FIG. 2, each of the plasma gas pressure and shield gas pressure remains constant during the piercing phase between time $t_1$-$t_3$ (wherein a pierce hole is formed through the workpiece) and a cutting phase between time $t_3$-$t_4$ (wherein the workpiece is cut to form a desired work product). According to one standard operating procedure, the plasma gas pressure is maintained at around 60 psi during the piercing and cutting phases, during which the shield gas is maintained at about 80 psi. Other notable features of the timeline of FIG. 2 are the main cutting current ramp up phase at time $t_1$-$t_2$ (wherein the main cutting current is ramped from the pilot current level of 10-50 amps to, for example, 150 amps) and the main cutting current and plasma gas pressure ramp down phases at time $t_4$-$t_5$ (wherein the main cutting current is ramped down to 0 amps and the plasma gas pressure is ramped down to or near 0 psi).

Figure 3:
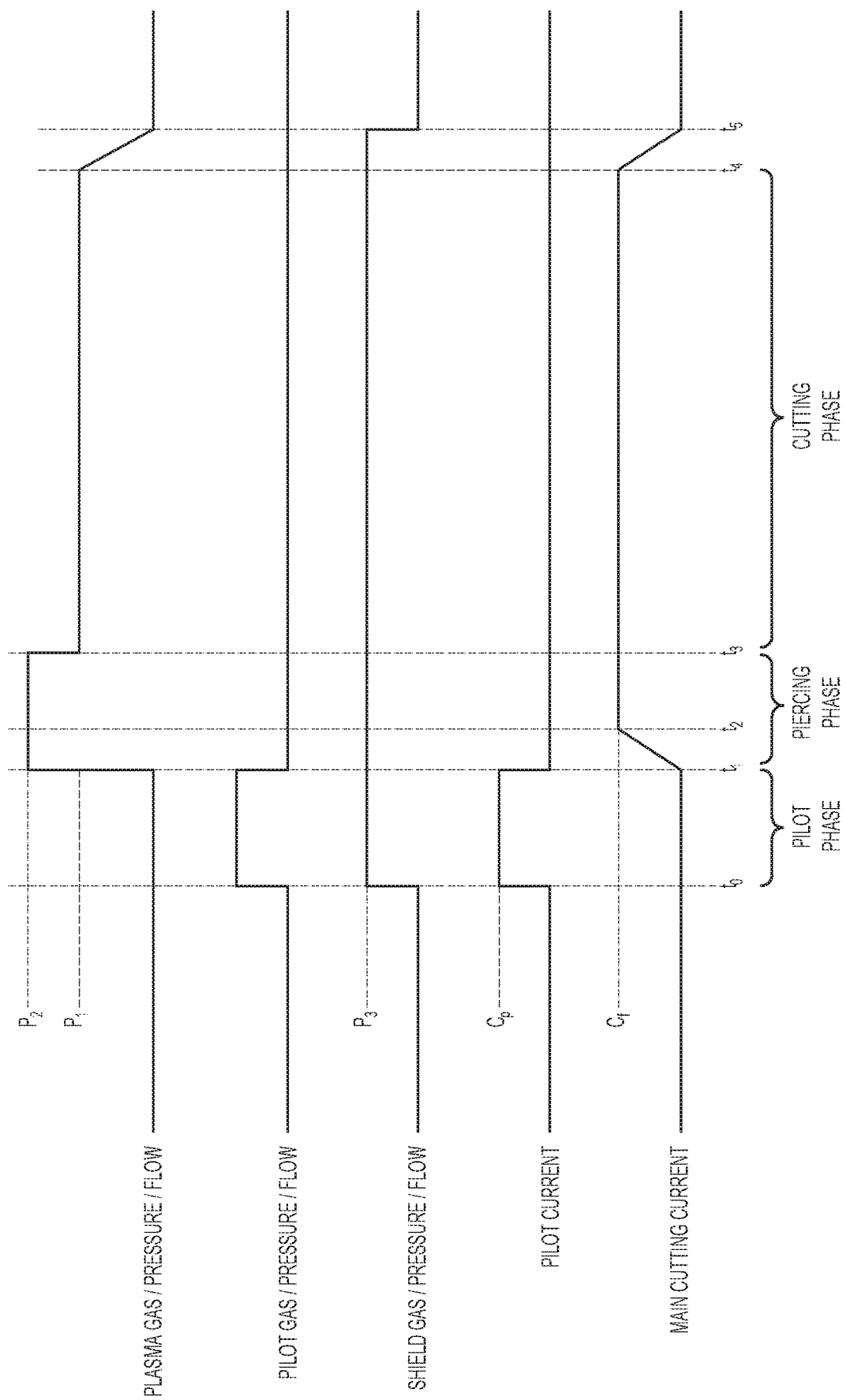
FIG. 3 is a graph showing variations in plasma torch operating parameters over time wherein an elevated plasma gas pressure is provided during a piercing operation.

FIG. 3 is a graph showing variations in plasma torch operating parameters over time wherein an elevated plasma gas pressure is provided during a piercing operation. During plasma torch startup at time to, pilot current $C_p$ (e.g. 10 to 50 amps) is first supplied to the nozzle 24 to generate an arc between the nozzle 24 and the electrode 23 across the process gas flow channel 30 through which a pilot gas is supplied. As pilot gas flows through channel 30 during arc initiation it is ionized to form an electrically conductive plasma that is then directed out the nozzle toward an electrically conductive workpiece (e.g. metal workpiece). Upon arc transfer to the workpiece at time $t_1$, main cutting current is supplied to the electrode 23 at full current Cr and an electrical circuit is established between the power supply and the workpiece. According to some implementations, the switching from pilot current $C_p$ to full main cutting current $C_f$ commences upon the power supply detecting a change in current when the plasma arc is transferred to the workpiece. During the switching, the power supply disconnects from the nozzle 24 and the main cutting current is ramped up to full cutting current $C_f$. At time $t_1$ plasma gas is provided through the process gas flow channel at a pressure P2 and a piercing phase commences. A plasma arc that closes the electrical circuit is thus established between the electrode 23 and the workpiece that is sufficient to cut through the workpiece by a localized melting of the material from which the workpiece is made. As shown in FIG. 3, when main cutting current is supplied to the electrode 23, pilot current to the nozzle 24 is terminated and the supply of pilot gas ceases as the supply of plasma gas is initiated. According to some implementations, the pilot gas and the plasma gas are the same. In such instances, the switching from pilot gas to plasma gas may only involve increasing the process gas pressure. As further illustrated in FIG. 3, a shield gas 33 is typically caused to flow through the shield gas flow channel 31 beginning at time to.

In the implementation of FIG. 3, the plasma gas pressure is initially steps up to an elevated pressure P2 at the commencement of the piercing phase at time $t_1$, and remains elevated during the duration of the piercing phase. At the end of the piercing phase at time $t_3$ the plasma gas pressure is then lowered pressure P1 during the cutting phase between times $t_3$-$t_4$. According to some implementations pressure P2 is 10% to 50% greater than pressure P1. Other notable features of the timeline of FIG. 3 are the main cutting current ramp up phase $t_1$-$t_2$ (wherein the main cutting current is ramped to, for example, 400 amps) and the main cutting current and plasma gas pressure ramp down phase $t_4$-$t_5$ (wherein the main cutting current is ramped down to 0 amps and the plasma gas pressure is ramped down to or near 0 psi).

As discussed above, providing the plasma gas at an elevated pressure during the piercing phase as compared to its pressure during the cutting phase results in an overall increase in power and the momentum of the arc. Thus, at a given current level delivered to the electrode of the plasma torch during piercing, in order for ionization of the plasma gas to occur, the voltage applied across the plasma torch electrode 23 will increase due to the increase in arc chamber pressure. The increase in voltage results in the plasma arc operating at a higher power (P=V*I) to produce higher plasma enthalpy. This facilitate a more effective melting of the metal during piercing, particularly in workpieces of enhanced thicknesses (e.g. >1.0 inch). The higher pressure also increases the momentum of the plasma jet stream causing it to strike the workpiece with a greater force. This advantageously results in a greater amount of molten metal residing in the pierce to be expelled from the pierce during the formation of the pierce hole to make way for the plasma arc as the pierce depth increases. In addition, as a result of the higher striking force of the plasma arc on the molten metal along with the a strategic placement of exit holes in the shield cap 25, the molten metal is dispersed away from the workpiece or over a greater area reducing the formation of large molten and/or solidified metal pools around the circumference of the produced pierce hole. This has the advantage of reducing lead-in lengths between the pierce hole and a location where the cut pattern of the workpiece originates for lack of having to maneuver around large pools. The reduced lead-in length reduces the cut time and also results in less scrap metal being produced during the cutting process. The risk of the torch colliding with molten and/or solidified metallic pools located around the pierce hole is also reduced.

Figure 4:
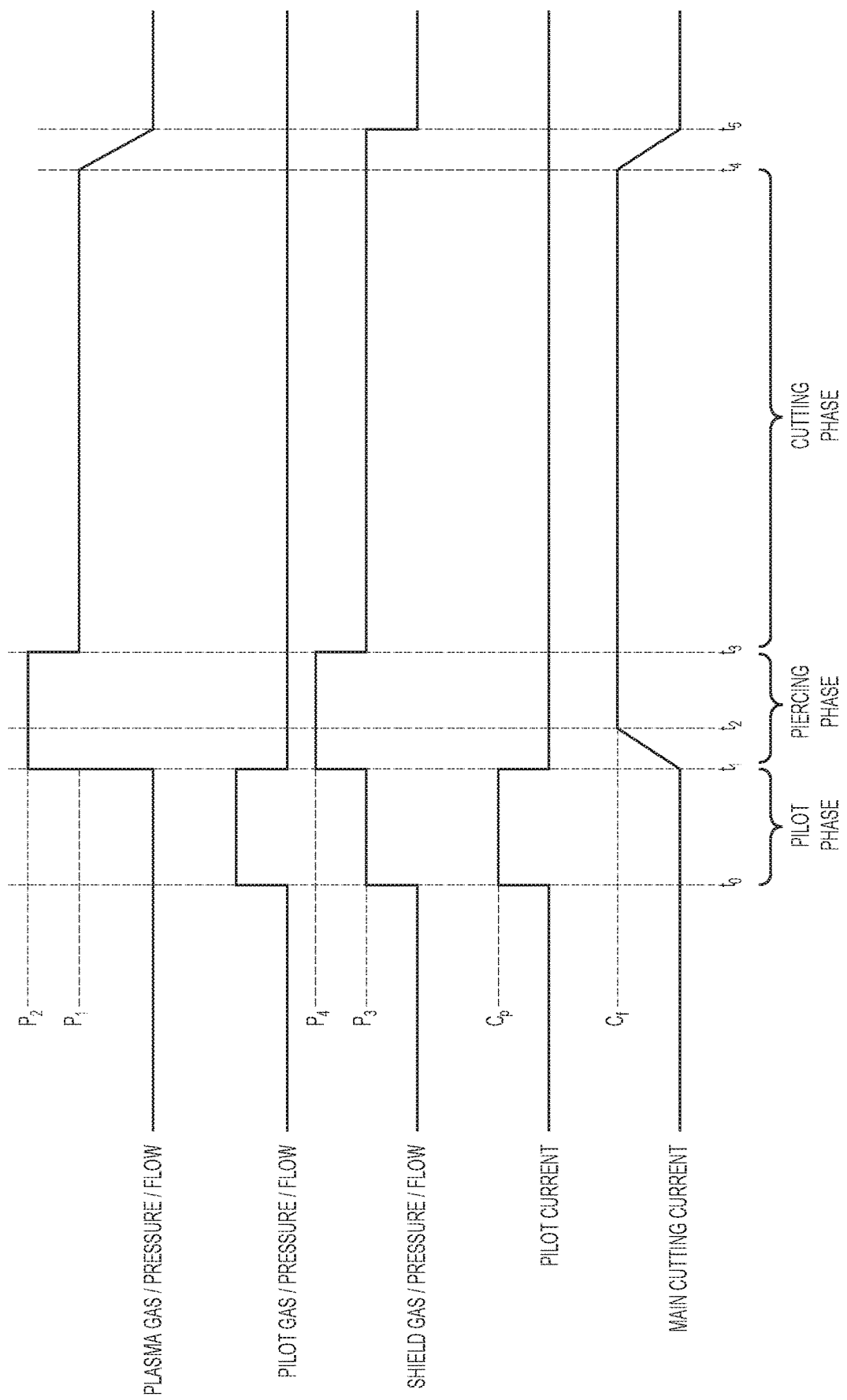
FIG. 4 is a graph showing variations in plasma torch operating parameters over time wherein an elevated plasma gas pressure and an elevated shield gas pressure is provided during a piercing operation

According to one implementation the full main cutting current $C_f$ delivered to the electrode 23 is 400 amps and the plasma gas is delivered to the plasma gas flow channel 30 at 80+5 psi during the piercing phase and is then lowered to 60+5 psi during the cutting phase. In the implementation of FIG. 3, the shield gas pressure P3 is maintained constant during the pilot, piercing and cutting phases at a pressure of between 80 and 95 psi in high amperage applications. However, as shown in FIG. 4, according to some implementations the shield gas pressure is caused to increase during the piercing phase from a pressure P3 to a pressure P4. According to one such implementation, P3 is maintained at 80+5 psi and P4 is maintained at 95+5 psi. Increasing the shield gas pressure at the same time the plasma gas pressure is elevated provides a greater overall impingement pressure being applied inside the pierce as the pierce hole is being cut. As noted above, this has the advantage of more effectively displacing the molten metal produced inside the pierce out and away from the pierce to reduce or eliminate altogether the formation of large molten and/or solidified metal pools around the pierce hole when the piercing operation is complete. Maintaining the shield gas pressure at an elevated level P4 during the piercing phase also provides added protection of the torch by deflecting molten blow back caused by the increased plasma gas pressure P2.

In the processes disclosed herein each of the plasma gas and shield gas may be for example, compressed air, oxygen, nitrogen, $H_{35}$ (35% hydrogen/65% argon). The shield gas may also be a $H_2O$ mist. The plasma and shield gases used in a particular situation are largely dependent on the composition and thickness of the workpiece being cut.

Table 1 below includes plasma torch operating data and pierce times associated with a traditional piercing operation. Table 2 below includes plasma torch operating data and pierce times associated with a process carried out in accordance with an aspect of the present invention. Tables 1 and 2 demonstrate that by increasing plasma gas pressure and shield gas pressure during the piercing phase, the time to produce a pierce hole in a flat carbon steel workpiece is dramatically reduced. In each of the piercing operations of Table 1 and Table 2 the plasma gas was oxygen and the shield gas was compressed air.

TABLE 1

| Workpiece Thickness | Plasma Gas Pressure | Shield Gas Pressure | Pierce & Cutting Current | Pierce Time |
|---|---|---|---|---|
| 1.0" | 60 psi | 80 psi | 400 amps | 1.1 sec. |
| 1.25" | 60 psi | 80 psi | 400 amps | 1.5 sec. |
| 1.5" | 60 psi | 80 psi | 400 amps | 4.0 sec. |
| 1.75" | 60 psi | 80 psi | 400 amps | 4.5 sec. |
| 2.0" | 60 psi | 80 psi | 400 amps | 7.0 sec. |

TABLE 2

| Workpiece Thickness | Plasma Gas Pressure | Shield Gas Pressure | Pierce & Cutting Current | Pierce Time |
|---|---|---|---|---|
| 1.0" | 80 psi | 95 psi | 400 amps | 0.5 sec. |
| 1.25" | 80 psi | 95 psi | 400 amps | 1.0 sec. |
| 1.5" | 80 psi | 95 psi | 400 amps | 2.0 sec. |
| 1.75" | 80 psi | 95 psi | 400 amps | 3.0 sec. |
| 2.0" | 80 psi | 95 psi | 400 amps | 4.0 sec. |

Figure 5:
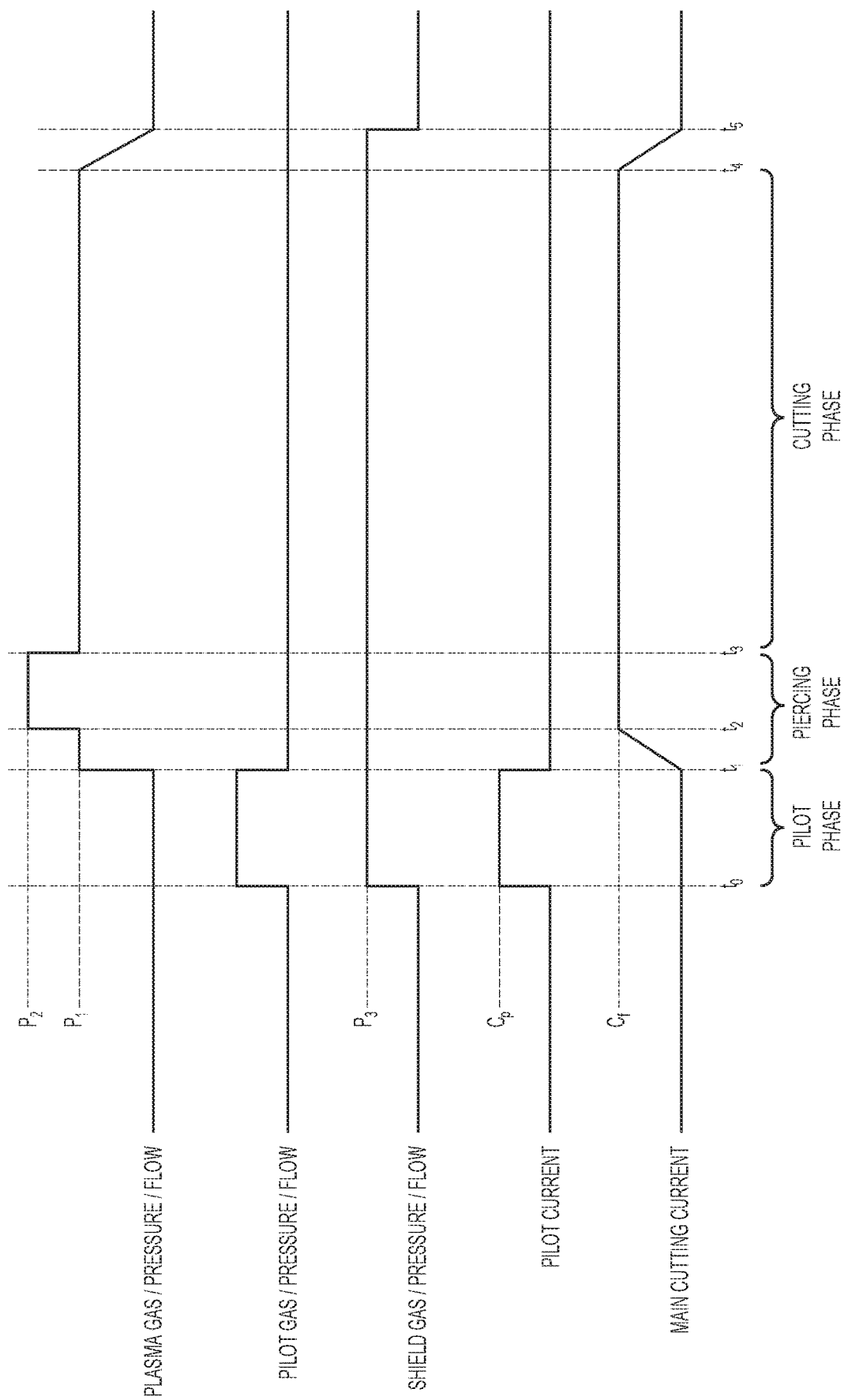
FIG. 5 is a graph similar to that of FIG. 4 with the plasma gas pressure being varied during the piercing phase.

FIG. 5 is a process similar to that of FIG. 4 with the plasma gas pressure being varied during the piercing phase. In the implementation of FIG. 5, the plasma gas is delivered to the plasma torch at a first pressure P1 at time $t_1$ and after a designated period of time at $t_2$ is increased to a second pressure P2. Thus, as the depth of the pierce increases over time, so does the plasma gas pressure. According to one implementation, the plasma gas pressure is maintained at the first pressure P1 between times $t_1$ and $t_2$, during which the main cutting current is ramped up from pilot current (e.g. 10 to 50 amps) to, for example, 400 amps. In the implementation of FIG. 5, the first pressure P1 corresponds to the plasma gas pressure delivered to the plasma torch during the cutting phase. According to other implementations the first pressure P1 may be higher or lower than the plasma gas pressure delivered to the plasma torch during the cutting phase.

With continued reference to FIG. 5, an advantage of delivering the plasma gas at the lower first pressure P1 during a first part of the piercing phase at time $t_1$-$t_2$, and then increasing to the second pressure P2 during a second part of the piercing phase at time $t_2$-$t_3$ is that it provides a more energy efficient piercing process. Because the molten metal resides closer to the surface of the workpiece during the first part of the piercing phase and because the vertical distance between the torch tip and the workpiece is generally at a minimum, the provision of plasma gas at the lower pressure P1 is sufficient to effectively melt the workpiece at the site of the pierce and to effectively remove the molten metal from the shallow pierce.

In the implementation of FIG. 5, during the piercing phase the plasma gas pressure transitions from P1 to P2 at time $t_2$ in a stepped fashion. The abrupt change in plasma gas pressure can more effectively cause an expulsion of molten metal accumulated in the pierce during a first part of the piercing phase. However, as shown in FIGS. 6-10, the plasma gas pressure may also be ramped up from the first pressure P1 to the second pressure P2 in a non-linear (e.g. exponential) or linear fashion. In the implementation of FIG. 5, upon the completion of the piercing phase at time $t_3$ the second pressure P2 is stepped down to the first pressure P1. However, as shown in FIGS. 7-10, the plasma gas pressure may also be ramped down from the second pressure P2 to the first pressure P1. In implementations of FIGS. 7-10 the plasma gas pressure is ramped down in a non-linear manner, but may instead be ramped down in a linear fashion.

Figure 6:
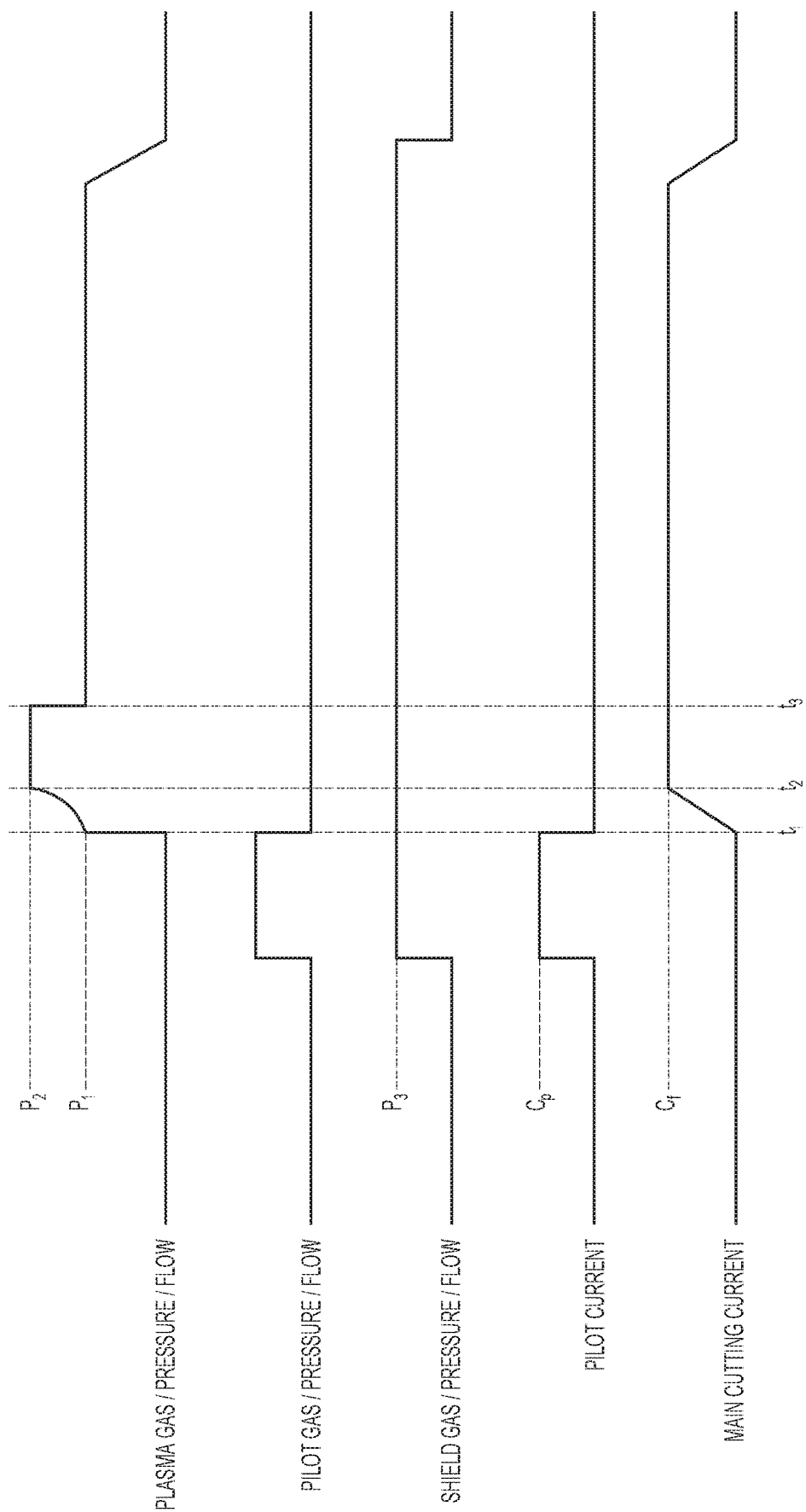
FIG. 6 is a variation of the graph of FIG. 5, wherein the plasma gas pressure increases in a non-linear manner from a first pressure to a second pressure during the piercing phase.

FIG. 6 is a variation of the process of FIG. 5 with the plasma gas pressure increasing non-linearly from the first pressure P1 to the second pressure P2 during the piercing phase.

Figure 7:
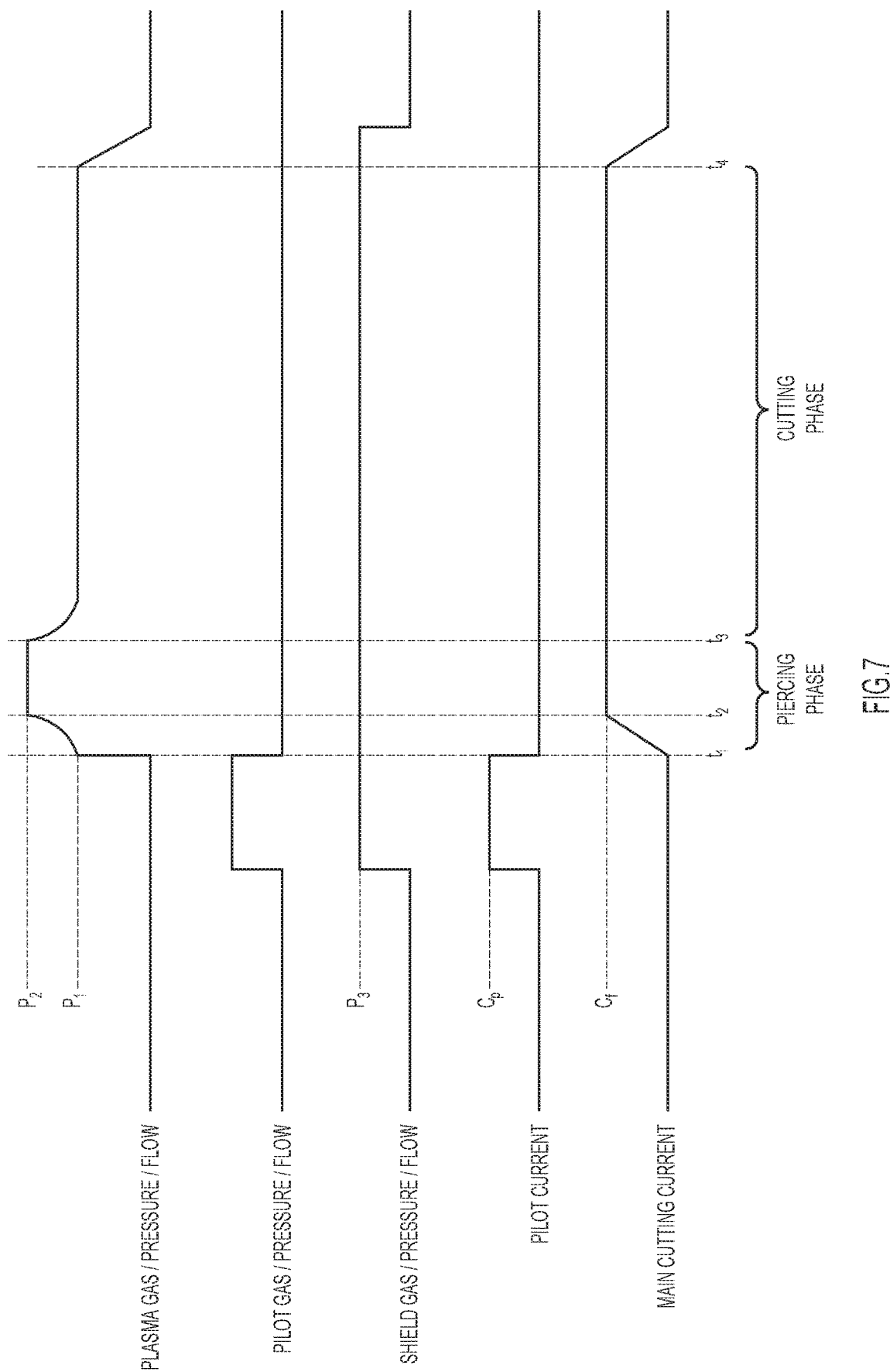
FIG. 7 is a variation of the graph of FIG. 6, wherein the plasma gas pressure decreases in a non-linear manner to the cutting phase pressure at the completion of the piercing phase.

FIG. 7 is a variation to the process of FIG. 6 with the plasma gas pressure P2 non-linearly decreasing to the cutting phase pressure P1 at the completion of the piercing phase, with the ramp down occurring during the cutting phase.

Figure 8:
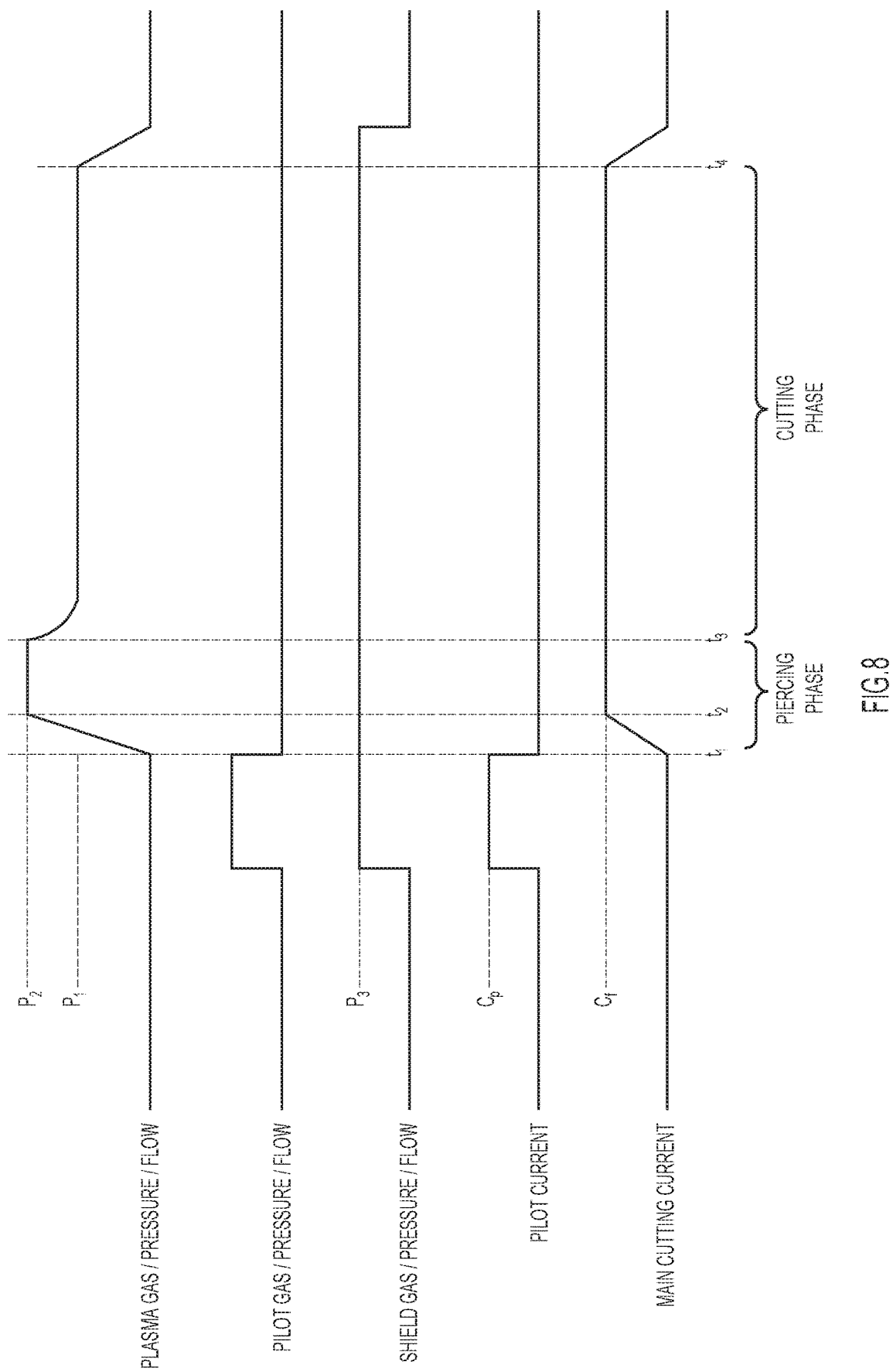
FIG. 8 is a variation of the graph of FIG. 7 with there being a linear plasma gas pressure increase during a first part of the piercing phase.

FIG. 8 is a variation of the process of FIG. 7 with there being a linear plasma gas pressure increase during at least a first part of the piercing phase during time $t_1$-$t_2$. In the example of FIG. 8, between times $t_1$ and $t_2$, the plasma gas pressure is increased from the pilot pressure to, for example, 80 psi in a continuous linear manner.

Figure 9:
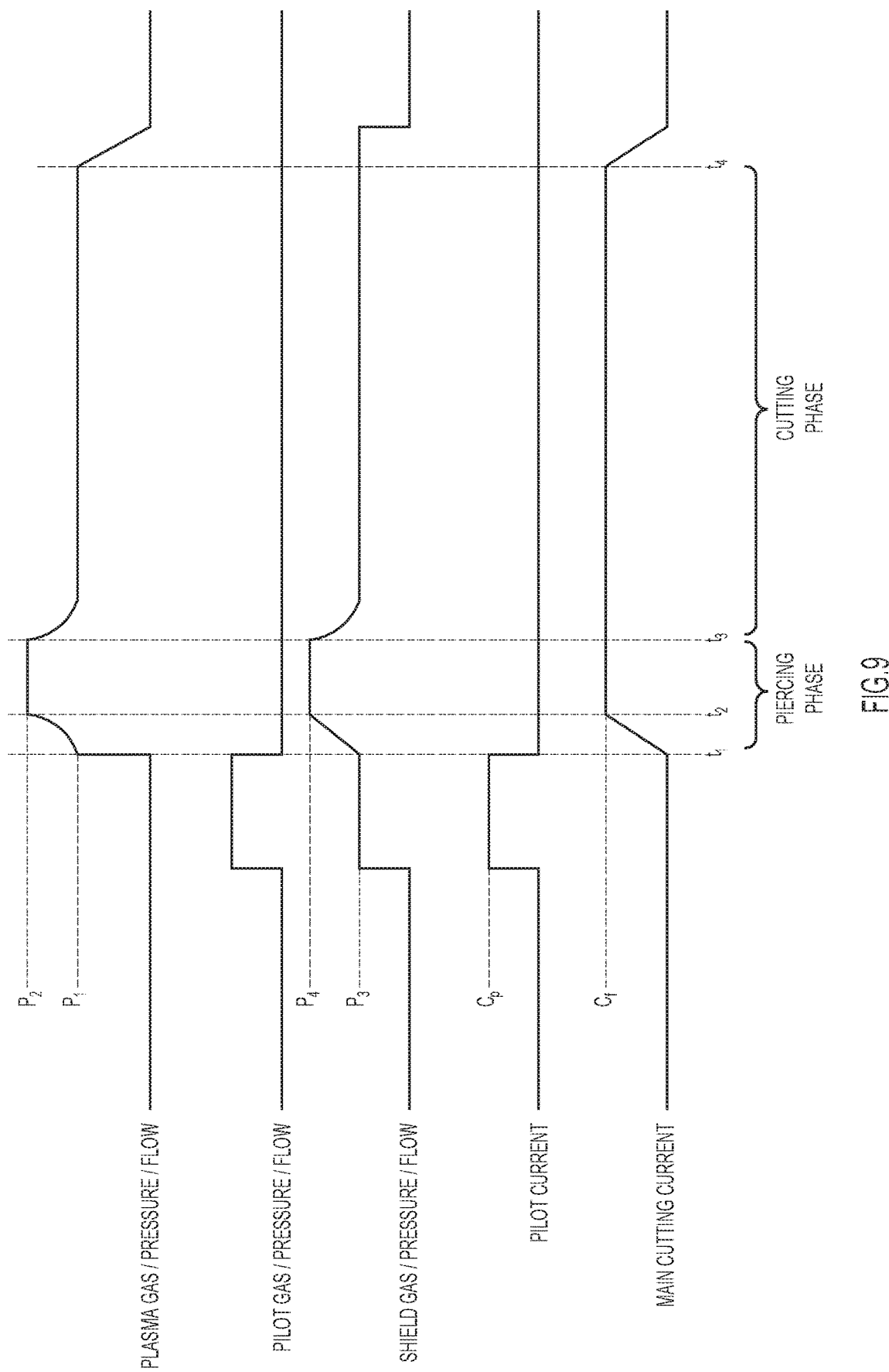
FIG. 9 is a variation of the graph of FIG. 7 with the shield gas pressure being elevated during the piercing phase.

FIG. 9 is a variation to the process of FIG. 7. In the implementation of FIG. 7, the shield gas pressure P3 is maintained constant during the pilot, piercing and cutting phases at a pressure of between 80 and 95 psi. However, as shown in FIG. 9, according to some implementations the shield gas pressure is caused to increase during the piercing phase from a first pressure P3 to a second pressure P4. According to one such implementation, P3 is maintained at 80±5 psi and P4 is maintained at 95±5 psi. Increasing the shield gas pressure at the same time the plasma gas pressure is elevated provides a greater overall impingement pressure being applied inside the pierce as the pierce hole is being cut. As noted above, this has the advantage of more effectively displacing the molten metal produced inside the pierce out and away from the pierce to minimize or eliminate altogether the formation of large molten and/or solidified metal pools around the pierce hole during the piercing phase. Maintaining the shield gas pressure at an elevated level P4 during the piercing phase also provides added protection of the torch by deflecting molten blow back.

In the implementation of FIG. 4 the shield gas pressure was increased from P3 to P4 in a stepped manner and was decreased from P4 to P3 in a stepped manner. However, as shown in FIG. 9, according to other implementations P3 is ramped up to P4 and P4 is subsequently ramped down to P3 at the beginning and at the end of the piercing process. The ramping up and ramping down can occur in a linear or non-linear manner. In the implementation of FIG. 9 the ramp up from P3 to P4 is linear and the ramped down from P4 to P3 is non-linear.

Figure 10:
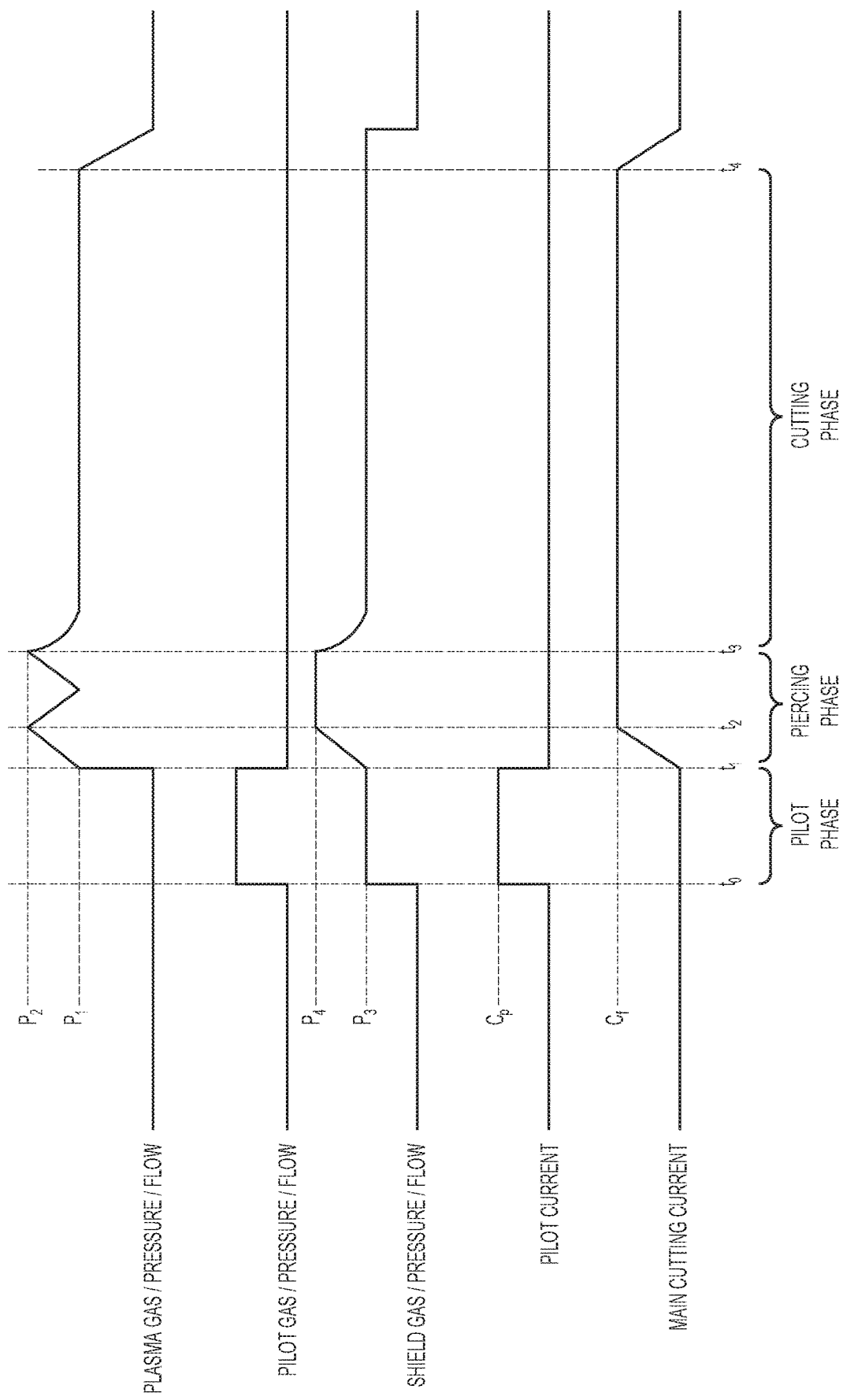
FIG. 10 is a variation to the graph of FIG. 9 with the plasma gas pressure being pulsed during the piercing phase.

The processes of FIGS. 4, 9 and 10 provide for increasing shield gas pressure during the piercing phase. However, it is important to note the processes of FIGS. 5-8 and 11-18 may also be modified to incorporate such a feature.

FIG. 10 is a variation to the process of FIG. 9 with the plasma gas pressure being pulsed between pressures P1 and P2 during the piercing phase. The pulsing causes the ionized plasma jet stream to strike against the workpiece at alternating high and low forces in a manner analogous to a jackhammer. In the implementation of FIG. 10 the plasma gas pressure variation includes two waves 10 and 12, but may include any number of waves. With reference to FIG. 10, the first wave 10 includes a linear ramp up from P3 to P4 and a linear ramp down from P4 to P3, and the second wave 12 includes a linear ramp up from P3 to P4 and a non-linear ramp down from P4 to P3. According to other implementations the alternating between P3 and P4 occurs in a stepped manner.

In the process of FIG. 10 the final ramp down from P4 to P3 occurs during the cutting phase in a manner similar to the processes of FIGS. 8 and 9.

Figure 11:
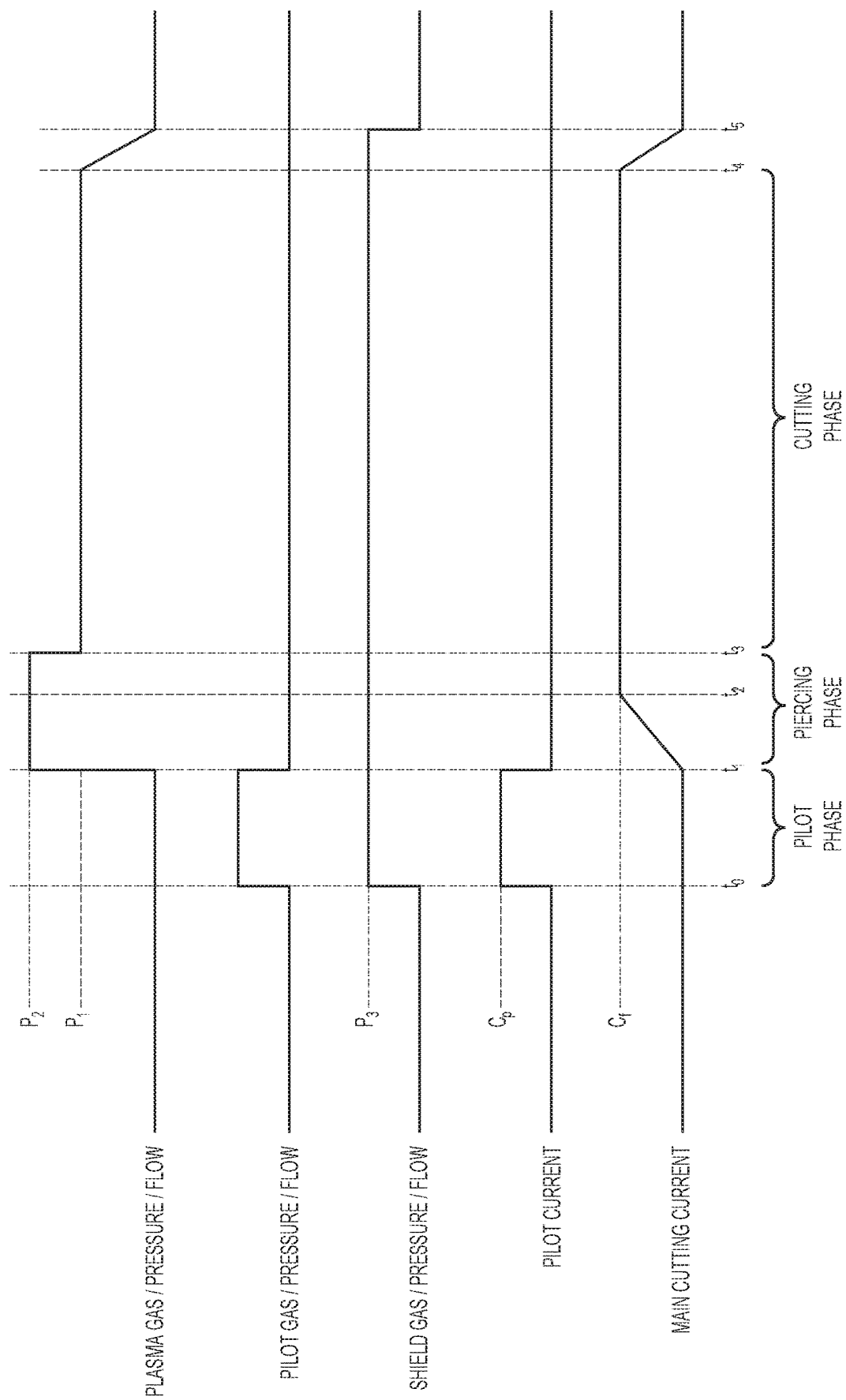
FIG. 11 is a variation of the graph of FIG. 3 with the main cutting current ramp up time being extended to occur over a longer time period.

FIG. 11 is a variation to the process of FIG. 3 with the main cutting current ramp up time being extended to occur over a longer time period. The faster ramp rate of FIG. 3 is more appropriate for cutting metals, such as stainless steel and aluminum, wherein a non-oxygen containing plasma and shield gas are used during the piercing and cutting phases. Examples of non-oxidizing gases are nitrogen and $H_{35}$ (35% hydrogen/65% argon mixture). The lower ramp rate of FIG. 11 is more appropriate for ferrous metals, such as mild steel, wherein oxygen containing plasma and shield gas are appropriately used during the piercing and cutting phases. Examples of oxidizing gases are air and oxygen. The type of emitter 29 used in the plasma torch also affects the selection of an appropriate ramp up time. For example, when the emitter 29 is tungsten it does not tend to wear significantly when a nitrogen plasma jet stream is used to cut, for example, a stainless steel workpiece. As such, higher ramp up rates, or even a stepped increase in main cutting current (see FIG. 12), is appropriate since it will not significantly affect the life of the electrode 23. However, when the emitter is hafnium, a hafnium puddle typically exists at the tip of the electrode at the end of the pilot phase. In such a situation, if the main cutting current is ramped up too fast it can result in the hafnium puddle being blown out the plasma torch nozzle. If this occurs, the life of the electrode is significantly reduced.

Figure 12:
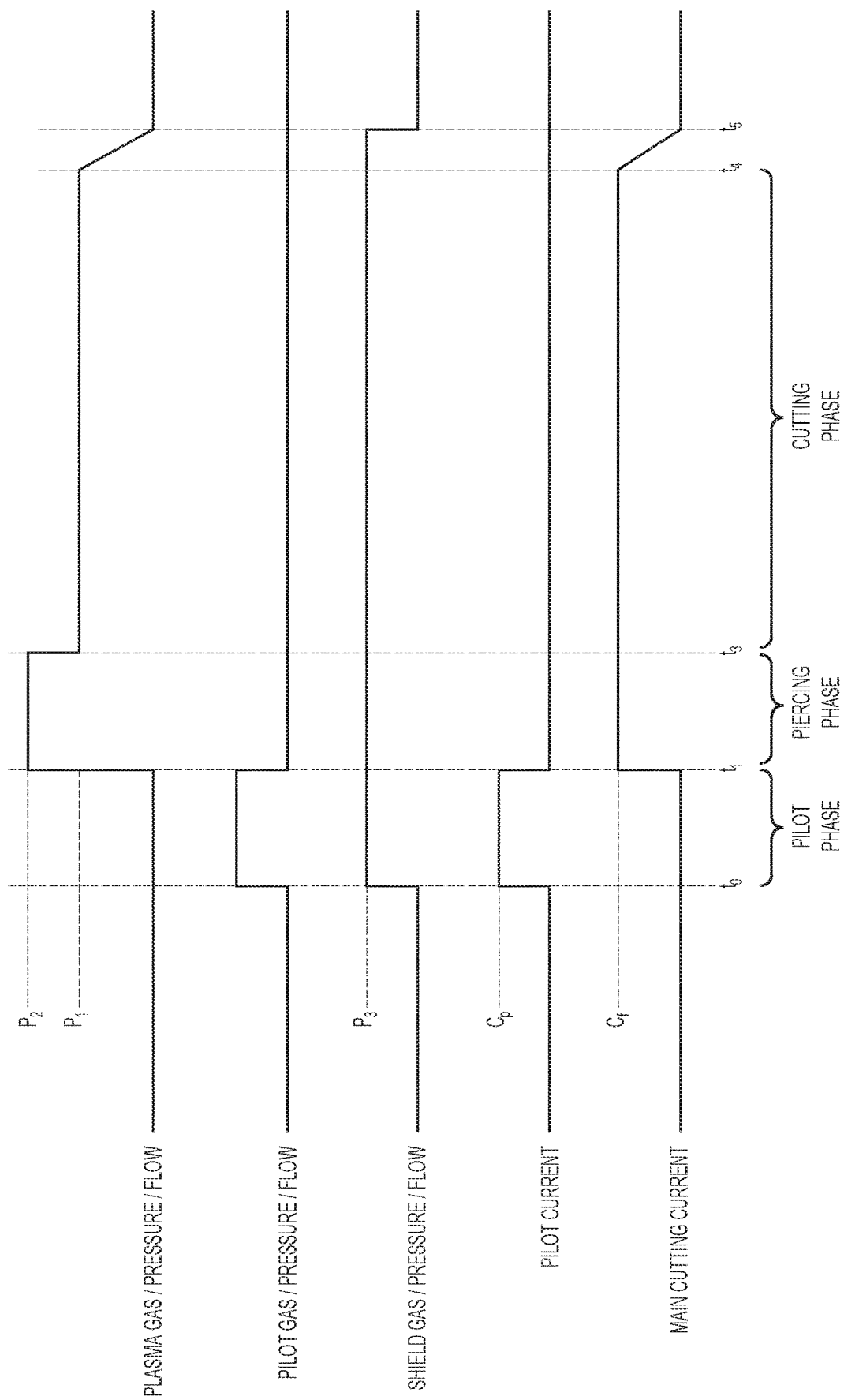
FIG. 12 is a variation of the graph of FIG. 3 with the main cutting current being delivered to the electrode of the plasma torch in a stepped manner.

FIG. 12 is a variation of the process of FIG. 3 with the main cutting current being delivered to the electrode of the plasma torch in a stepped manner.

Figure 13:
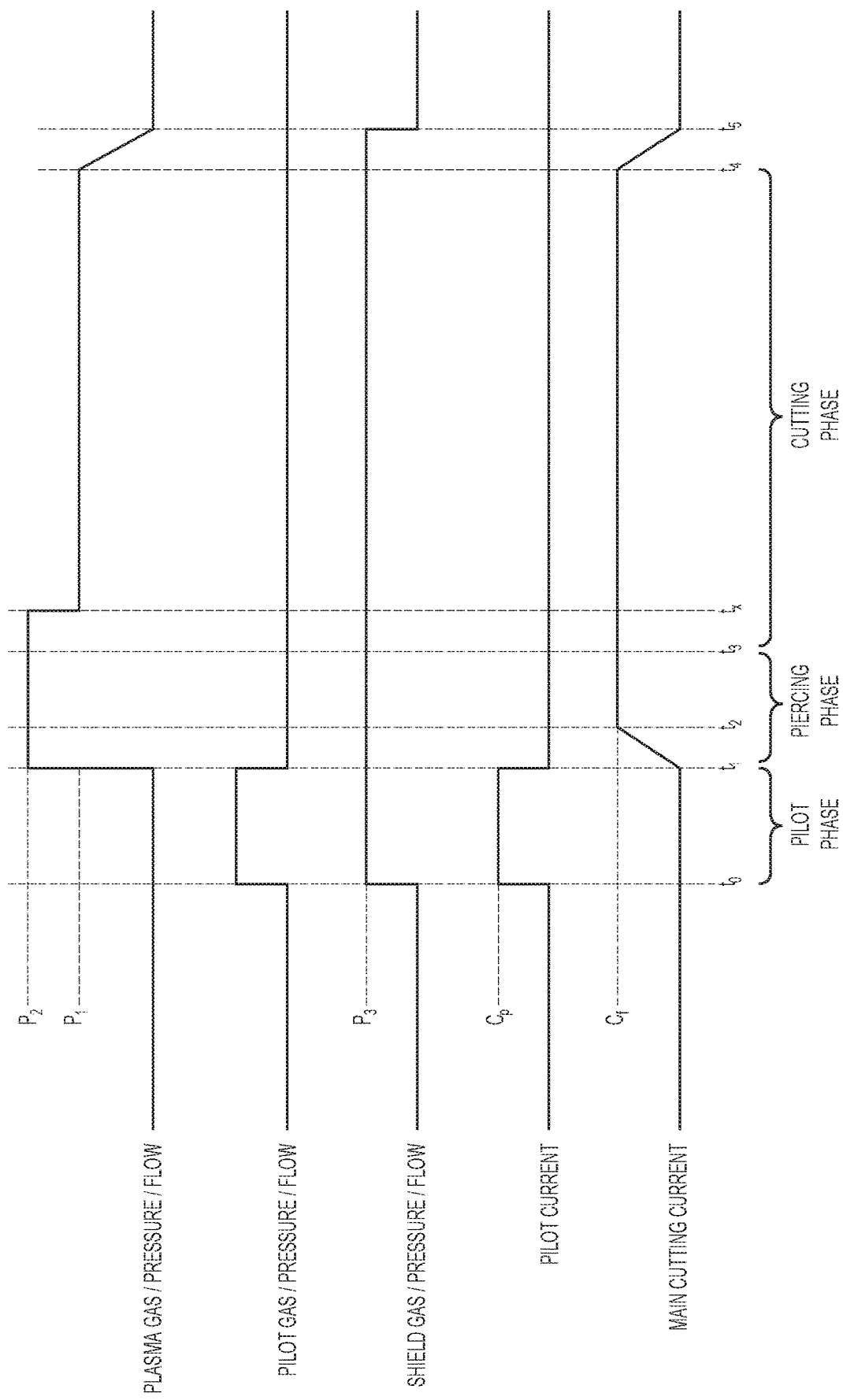
FIG. 13 is a variation of the graph of FIG. 3 with the plasma gas pressure being maintained at an elevated pressure after the end of the piercing phase and during a first part of the cutting phase.

FIG. 13 is a variation of the process of FIG. 3 with the plasma gas pressure being maintained at an elevated pressure P2 after the end of the piercing phase $t_3$ during a first part (time $t_3$-$t_x$) of the cutting phase (time $t_3$-$t_4$). As explained above, in some instances dross can accumulate around the pierce hole during its formation. This effectively increases the thickness of metal to be cut in the area surrounding the pierce hole. By maintaining the plasma gas pressure at the elevated pressure P2 after the end of the piercing phase and during a first part of the cutting phase, the ionized plasma jet stream (i.e. plasma arc) is maintained at a higher temperature and impinges on the workpiece at a higher force. As a result the plasma arc more easily cuts through any metal pools surrounding the pierce hole as the plasma torch is moved away from the pierce hole. This has an advantage of reducing the overall cutting time by eliminating the need to maneuver around the metal pools. This also reduces the risk of the torch coming into contact with the metal pools which can cause double arcing and damage to the torch consumables.

Figure 14:
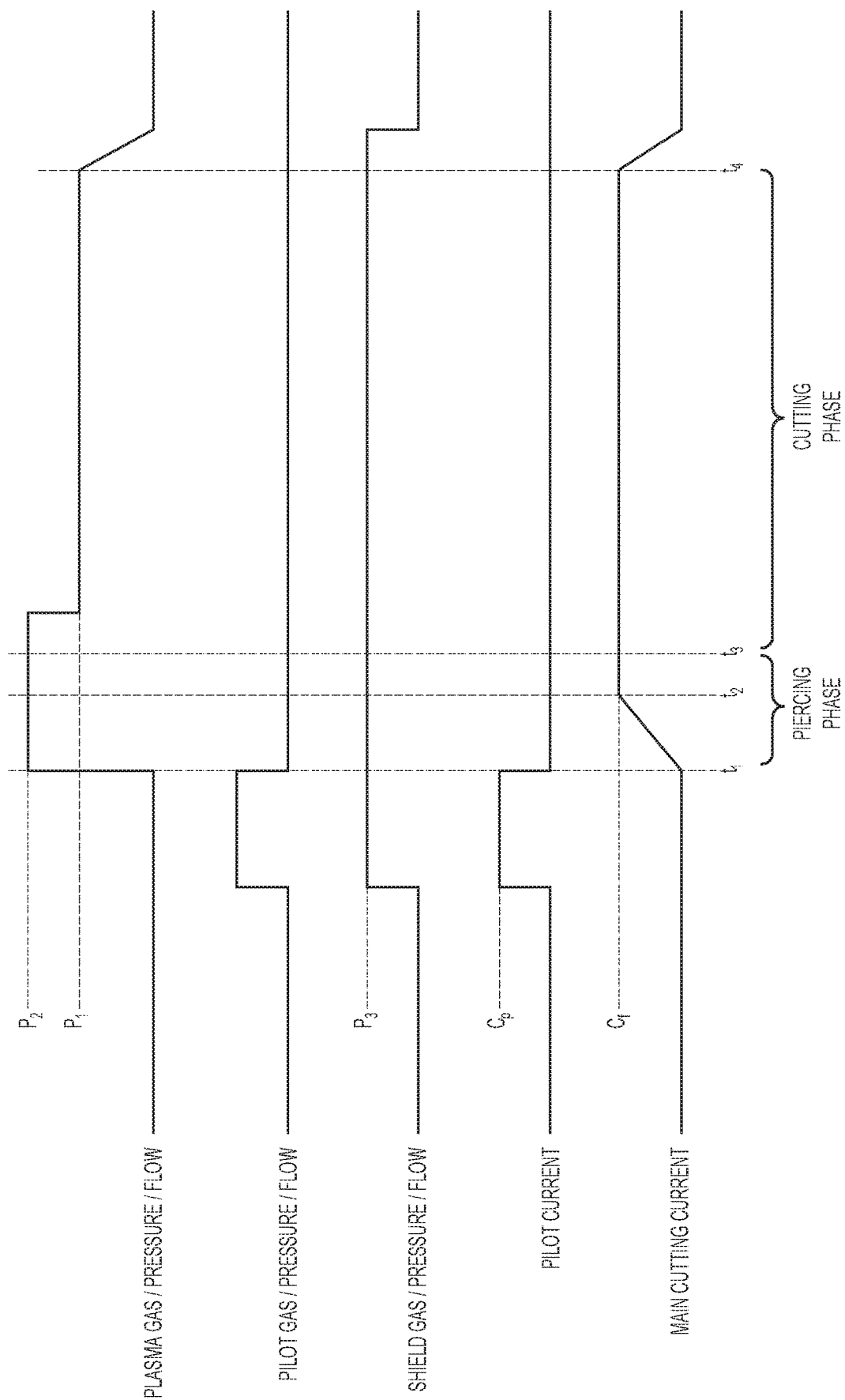
FIG. 14 is a variation of the graph of FIG. 13 with the main cutting current ramp up time being extended to occur over a longer time period.

FIG. 14 is a variation of the process of FIG. 13 with the main cutting current ramp up time being extended to occur over a longer time period.

Figure 15:
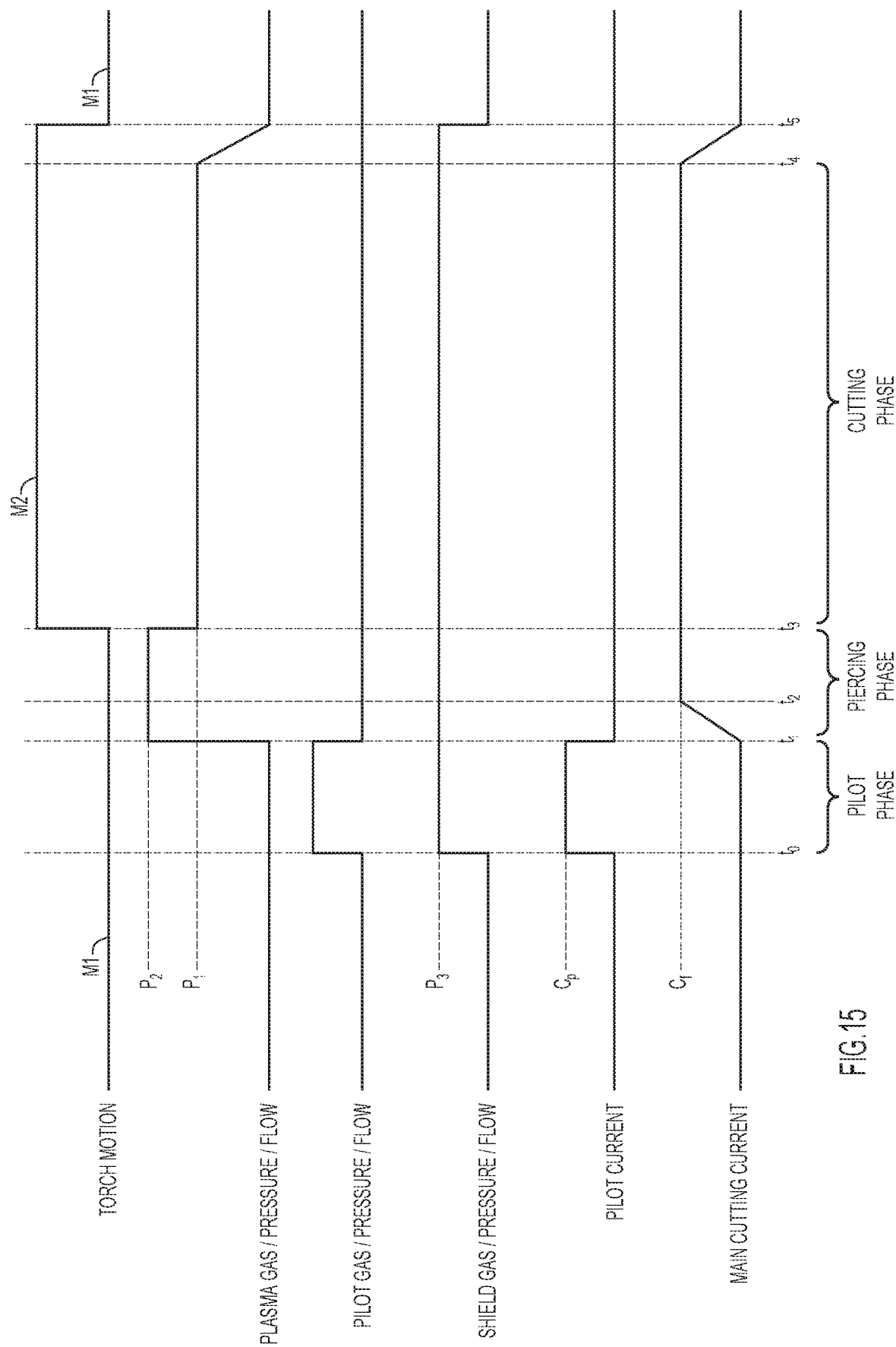
FIG. 15 is a graph like that of FIG. 3 that further shows an initiation of a movement of the plasma torch away from the pierce hole at the end of the piercing phase.
Figure 16:
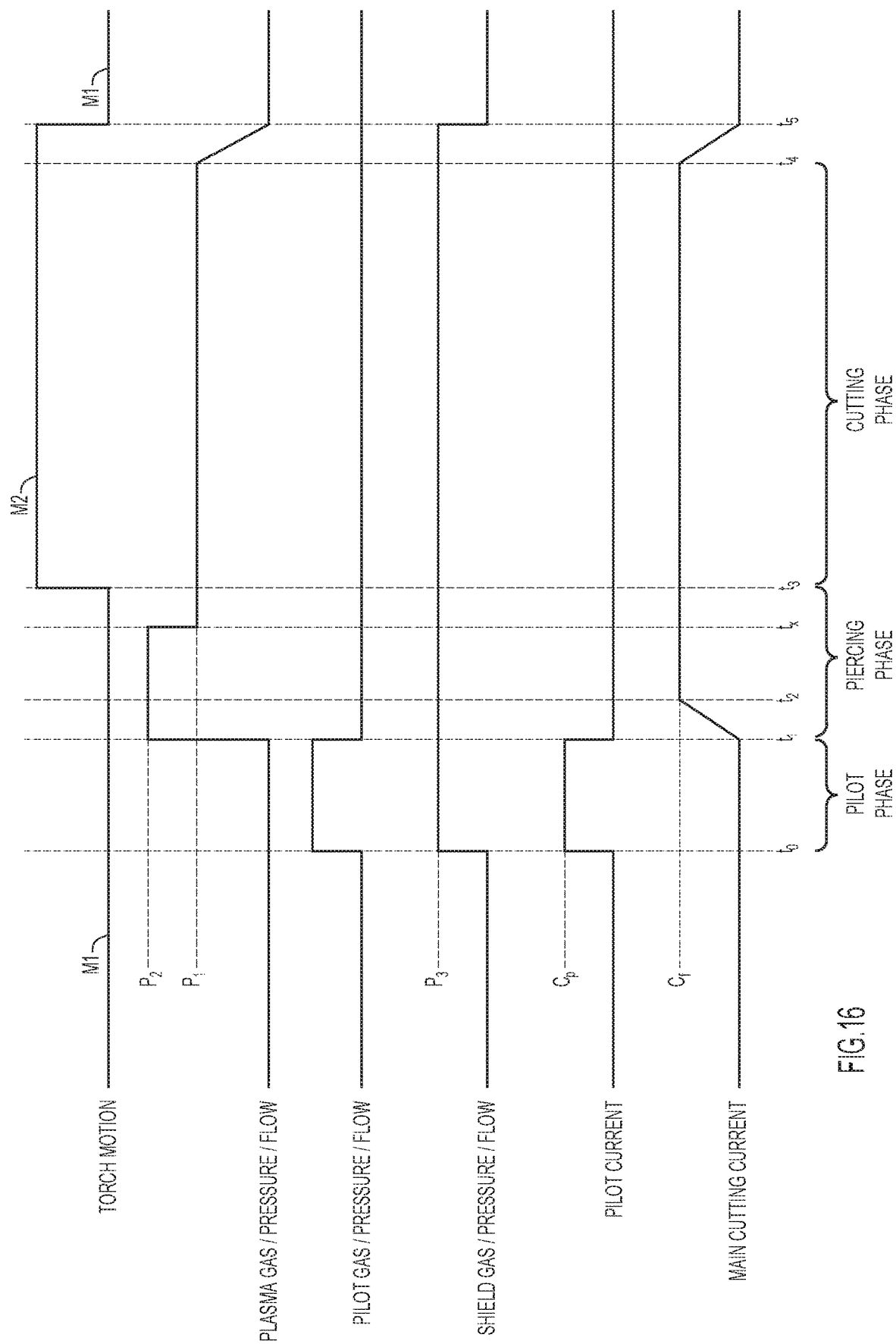
FIG. 16 is a graph like that of FIG. 3 that further shows an initiation of a movement of the plasma torch away from the pierce hole at a time interval after the end of the piercing phase.
Figure 17:
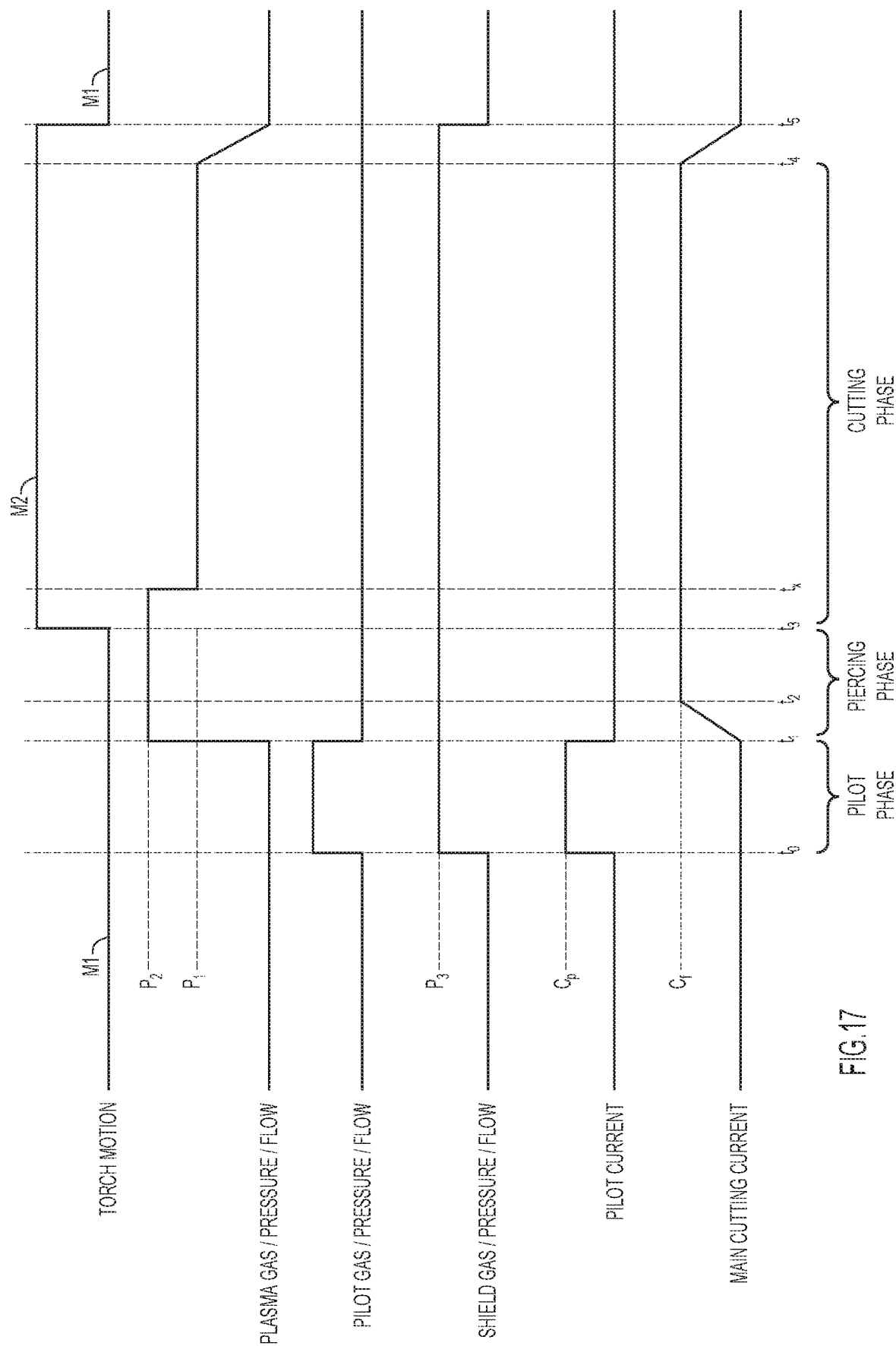
FIG. 17 is a graph like that of FIG. 13 that further shows an initiation of a movement of the plasma torch away from the pierce hole at a time interval after the end of the piercing phase.

FIG. 15 is a graph like that of FIG. 3 that further shows an initiation of a movement of the plasma torch away from the pierce hole at the end of the piercing phase. In FIGS. 15-17 this movement of the plasma torch is denoted by the line labeled "Torch Motion". The lines M1 represent the plasma torch in a stationary state in relation to a movement along a length and/or width of the workpiece. Line M2 represents the plasma torch being in horizontal motion above the top surface of the workpiece. In the implementation of FIG. 15, the plasma torch remains stationary during the piercing phase and is then set in motion in a lengthwise and/or widthwise direction of the workpiece away from the pierce hole at time $t_3$ coincident with the termination of the piercing phase and the beginning of the cutting phase. It is important to note that during the M1 stationary state the height of the torch and or the angle of the torch may be varied. For example, while the pierce hole is being produced the height of the torch may be varied as the depth of the pierce hole increases and/or the angle of the torch may be varied to achieve a bevel cut. Notwithstanding the foregoing example, in instances of the workpiece comprising a cylindrical form, such as a pipe, line M2 represents the plasma torch being in circumferential motion around the pipe.

FIG. 16 is a graph like that of FIG. 3 that further shows an initiation of a movement of the plasma torch away from the pierce hole at a time interval after the end of the piercing phase. In the implementation of FIG. 16 the piercing phase includes a first part at time $t_1$-$t_x$ during which the plasma gas is provided at the elevated pressure P2, and a second part at time $t_x$-$t_3$ during which the plasma gas is provided at the cutting pressure P1. Lowering the plasma gas pressure from P2 to P1 while the torch continues to reside above the pierce hole allows for the stabilization of the plasma arc at the new cutting pressure before torch motion away from the pierce hole is initiated. The delay in moving the torch away from the pierce hole also provides time to reposition the height and/or tilt angle of the torch before the cutting phase commences.

FIG. 17 is a graph like that of FIG. 13 that further shows an initiation of movement of the plasma torch away from the pierce hole at a time interval after the end of the piercing phase and while the plasma gas is being delivered to the plasma torch at the elevated pressure P2. The advantage of this process is discussed above in conjunction with the description of FIG. 13.

In each of the implementations disclosed herein, the height of the plasma torch tip above the location of the pierce hole may vary as the depth of the pierce hole increases. For example, the height of the plasma torch tip above the top surface of the workpiece may decrease between times $t_1$-$t_3$ to reduce plasma arc elongation during the piercing process. Excessive elongation of the plasma arc reduces its cutting ability and can result in the arc being extinguished.

As noted above, FIG. 1 is a simplified illustration of a distal end portion of a plasma torch sufficient for representing the operational characteristics disclosed herein. U.S. Pat. No. 9,131,596 discloses a plasma torch that is also usable in carrying out the processes disclosed herein, and is incorporated herein by reference in its entirety.

The previous examples are not suggested to limit other variations. The present disclosure is merely exemplary in nature and, thus, variations that do not depart from the spirit of the disclosure are intended to be within the scope of the present disclosure.

What is claimed is:

1. A method for piercing and cutting a workpiece using a plasma torch that includes an electrode and a nozzle spaced from and surrounding a distal end portion of the electrode to form a process gas flow channel, the plasma torch comprises a shield cap spaced from and surrounding a distal end portion of the nozzle to form a shield gas flow channel, the method comprising:
  delivering a plasma gas at a first pressure through the process gas flow channel while ionizing the plasma gas to produce a plasma arc that extends between the electrode and the workpiece;
  performing a piercing operation by producing a pierce hole in the workpiece using the plasma arc;
  delivering a shield gas at a third pressure through the shield gas flow channel during the piercing operation, the shield gas being maintained at the third pressure throughout the piercing operation; and
  subsequent to the piercing operation,
    changing a pressure of the plasma gas from the first pressure to a second pressure lower than the first pressure, the first pressure being 10% to 50% greater than the second pressure, the changing the pressure of the plasma gas from the first pressure to the second pressure involves changing the pressure of the plasma gas so that the pressure of the plasma gas is linearly ramped down from the first pressure to the second pressure; and performing a cutting operation by delivering through the process gas flow channel the plasma gas at the second pressure, maintaining the plasma gas at the second pressure during the cutting operation, and with the plasma gas being delivered at the second pressure, forming a cut in the workpiece that originates at and extends away from a boundary of the pierce hole; delivering the shield gas at a fourth pressure through the shield gas flow channel during the cutting operation, the third pressure being greater than the fourth pressure; and maintaining the shield gas at the fourth pressure during the cutting operation.

2. The method according to claim 1, wherein during the piercing operation the plasma gas is ramped up in pressure from a pressure below the first pressure to the first pressure.

3. The method according to claim 2, wherein the plasma gas is ramped up in pressure in a linearly manner.

4. The method according to claim 1, wherein the first pressure of the plasma gas is in a range of 75 psi to 85 psi.

5. The method according to claim 4, wherein the second pressure of the plasma gas is in a range of 55 psi to 65 psi.

6. A method for piercing and cutting a workpiece using a plasma torch that includes an electrode and a nozzle spaced from and surrounding a distal end portion of the electrode to form a process gas flow channel, the plasma torch comprises a shield cap spaced from and surrounding a distal end portion of the nozzle to form a shield gas flow channel, the method comprising:

delivering a plasma gas at a first pressure through the process gas flow channel while ionizing the plasma gas to produce a plasma arc that extends between the electrode and the workpiece;

performing a piercing operation by producing a pierce hole in the workpiece using the plasma arc;

delivering a shield gas at a third pressure through the shield gas flow channel during the piercing operation, the shield gas being maintained at the third pressure throughout the piercing operation; and subsequent to the piercing operation, changing a pressure of the plasma gas from the first pressure to a second pressure lower than the first pressure, the first pressure being 10% to 50% greater than the second pressure, the changing the pressure of the plasma gas from the first pressure to the second pressure involves changing the pressure of the plasma gas so that the pressure of the plasma gas is non-linearly ramped down from the first pressure to the second pressure; and performing a cutting operation by delivering through the process gas flow channel the plasma gas at the second pressure, maintaining the plasma gas at the second pressure during the cutting operation, and with the plasma gas being delivered at the second pressure, forming a cut in the workpiece that originates at and extends away from a boundary of the pierce hole, and delivering the shield gas at a fourth pressure through the shield gas flow channel during the cutting operation, the third pressure being greater than the fourth pressure; and maintaining the shield gas at the fourth pressure during the cutting operation.

7. The method according to claim 6, wherein during the piercing operation the plasma gas is ramped up in pressure from a pressure below the first pressure to the first pressure.

8. The method according to claim 7, wherein the plasma gas is ramped up in pressure in a linearly manner.

9. The method according to claim 7, wherein the plasma gas is ramped up in pressure in a non-linear manner.

10. The method according to claim 6, wherein the first pressure of the plasma gas is in a range of 75 psi to 85 psi.

11. The method according to claim 10, wherein the second pressure of the plasma gas is in a range of 55 psi to 65 psi.

12. A method for piercing and cutting a workpiece using a plasma torch that includes an electrode and a nozzle spaced from and surrounding a distal end portion of the electrode to form a process gas flow channel, the plasma torch comprises a shield cap spaced from and surrounding a distal end portion of the nozzle to form a shield gas flow channel, the method comprising:

delivering a plasma gas at a first pressure through the process gas flow channel while ionizing the plasma gas to produce a plasma arc that extends between the electrode and the workpiece;

performing a piercing operation by producing a pierce hole in the workpiece using the plasma arc, during the piercing operation the plasma gas is ramped up in pressure from a pressure below the first pressure to the first pressure in a non-linear manner;

delivering a shield gas at a third pressure through the shield gas flow channel during the piercing operation, the shield gas being maintained at the third pressure throughout the piercing operation; and subsequent to the piercing operation, changing a pressure of the plasma gas from the first pressure to a second pressure by linearly ramping down the pressure of the plasma gas from the first pressure to the second pressure, the second pressure being lower than the first pressure, the first pressure being 10% to 50% greater than the second pressure; and performing a cutting operation by delivering through the process gas flow channel the plasma gas at the second pressure and maintaining the plasma gas at the second pressure during the cutting operation, and with the plasma gas being delivered at the second pressure through the process gas flow channel, forming a cut in the workpiece that originates at and extends away from a boundary of the pierce hole; and during the cutting operation, delivering through the shield gas flow channel the shield gas at a fourth pressure that is less than the third pressure, and maintaining the shield gas at the fourth pressure.

13. The method according to claim 12, wherein the change in pressure of the plasma gas from the first pressure to the second pressure occurs when as the change in pressure of the shield gas from the third pressure to the fourth pressure.

14. The method according to claim 12, wherein the first pressure of the plasma gas is in a range of 75 psi to 85 psi.

15. The method according to claim 14, wherein the second pressure of the plasma gas is in a range of 55 psi to 65 psi.

* * * * *